US012775299B2

(12) United States Patent
Barzen et al.

(10) Patent No.: US 12,775,299 B2
(45) Date of Patent: Oct. 27, 2026

(54) ADAPTIVE HAPTIC FEEDBACK CONTROL OF A USER INTERFACE

(71) Applicant: AGCO International GmbH, Neuhausen (CH)

(72) Inventors: Alexander Barzen, Marktoberdorf (DE); Korbinian Hornung, Marktoberdorf (DE)

(73) Assignee: AGCO International GmbH, Neuhausen (CH)

(*) Notice: Subject to any disclaimer, the term of this patent is extended or adjusted under 35 U.S.C. 154(b) by 104 days.

(21) Appl. No.: 18/910,394

(22) Filed: Oct. 9, 2024

(65) Prior Publication Data

US 2025/0147540 A1 May 8, 2025

(30) Foreign Application Priority Data

Nov. 2, 2023 (GB) ...................................... 2316817

(51) Int. Cl.
*G05G 9/047* (2006.01)
*A01B 59/06* (2006.01)
*A01B 71/02* (2006.01)
*G06F 3/01* (2006.01)

(52) U.S. Cl.
CPC ............. *G05G 9/047* (2013.01); *A01B 71/02* (2013.01); *G06F 3/016* (2013.01); *A01B 59/066* (2013.01); *G05G 2009/04766* (2013.01)

(58) Field of Classification Search
CPC .......... G05G 9/047; G05G 2009/04766; A01B 71/02; A01B 59/066; A01B 63/1006; G06F 3/016
See application file for complete search history.

(56) References Cited

U.S. PATENT DOCUMENTS

| | | | | |
|---|---|---|---|---|
| 7,086,292 B2 * | 8/2006 | Onodera | G05G 9/047 | 73/780 |
| 7,480,564 B2 * | 1/2009 | Metzler | A01B 69/007 | 701/50 |
| 2005/0016294 A1 * | 1/2005 | Onodera | G06F 3/0362 | 73/862.08 |
| 2006/0197741 A1 | 9/2006 | Biggadike | | |
| 2008/0180305 A1 * | 7/2008 | McRae | G06F 3/0219 | 341/176 |

(Continued)

FOREIGN PATENT DOCUMENTS

| | | |
|---|---|---|
| EP | 4129037 A1 | 2/2023 |
| KR | 20210044493 A | 4/2021 |

(Continued)

OTHER PUBLICATIONS

UK Intellectual Property Office, Search Report for related UK Application No. GB2316817.2, dated Mar. 12, 2024, 3 pages.

*Primary Examiner* — Mussa A Shaawat

(57) ABSTRACT

A user interface for controlling an agricultural machine and a method of adjusting a haptic feedback of an user interface including method acts for determining a set point position, determining a current position of the input element, and adjusting a ripple characteristic of at least one ripple according to a second ripple characteristic being different to a first ripple characteristic if the at least one ripple is located within an adjustment range extending between the set point position and the current position of the input element.

16 Claims, 10 Drawing Sheets

(56) References Cited

U.S. PATENT DOCUMENTS

2008/0238352 A1* 10/2008 Dattilo .................... G05G 1/04 318/575
2011/0063212 A1* 3/2011 Ries .................... G06F 3/03549 345/157
2013/0229272 A1* 9/2013 Elliott .................... G05G 9/047 74/471 XY
2013/0328517 A1* 12/2013 Gerdes ................ H02P 25/0805 318/701
2014/0117900 A1* 5/2014 Nee .................... H02P 25/0925 318/400.32
2014/0277641 A1* 9/2014 Bilobrov ............... G10L 19/018 700/94
2014/0343697 A1* 11/2014 Kuipers ................. B60K 35/10 700/83
2017/0100974 A1 4/2017 Smith
2017/0218600 A1 8/2017 Kassen et al.
2020/0257369 A1* 8/2020 Battlogg ................... A61F 2/38
2020/0355229 A1 11/2020 Battlogg
2021/0243951 A1* 8/2021 Vandike ............... A01B 79/005
2022/0283602 A1* 9/2022 Battlogg ................. F16H 59/02
2022/0404856 A1 12/2022 Dorn et al.
2023/0019305 A1 1/2023 Chen et al.
2023/0031876 A1* 2/2023 Battlogg ................ A45C 11/00
2023/0087434 A1* 3/2023 Battlogg ............... G06F 3/0362 345/163
2023/0244328 A1 8/2023 Battlogg et al.
2025/0352907 A1* 11/2025 Crabtree ............... A63F 13/355

FOREIGN PATENT DOCUMENTS

WO 2016198602 A1 12/2016
WO 2019138015 A1 7/2019
WO 2022200448 A1 9/2022

* cited by examiner

ADAPTIVE HAPTIC FEEDBACK CONTROL OF A USER INTERFACE

CROSS REFERENCE TO RELATED APPLICATION

This application claims the benefit of the filing date of U.K. Provisional Patent Application 2316817.2, "Adaptive Haptic Feedback Control of a User Interface," filed Nov. 2, 2023, the entire disclosure of which is incorporated herein by reference.

FIELD

The present disclosure relates generally to an adaptive haptic feedback control of a user interface.

BACKGROUND

Agricultural machines comprise user interfaces for manual control of the machines, e. g. to drive the machines or to control implements for treating an agricultural field. The user interfaces may be designed as steering wheels, joysticks, levers, rockers, knobs, buttons or any other control elements. The user interfaces may comprise an actuator for providing a haptic feedback to the user, e. g. a vibration, for indicating a specific situation such as a hazardous driving situation. The actuator may be of a magnetorheological type.

WO 2019/138015 A1 discloses a magnetorheological brake device for usage as a manual user interface in a vehicle. The user interface is rotatable and may provide a haptic feedback in terms of ripples. When rotating the user interface, the user may feel an alternately increasing or decreasing resistance according to the ripples.

BRIEF SUMMARY

An operator controlled agricultural machine comprises a user interface for performing any inputs related to settings, control demands and/or operating states of the agricultural machine. The settings, control demands and/or operating states of the agricultural machine may change depending on the operator inputs. Typically, such changes are indicated to an operator by optical means such as dial indicators, meters, light indicators or displays of the user interface. In addition to optical feedback, also haptic feedback of the user interface shall be possible. Hence, it is an objective to provide a user interface for controlling an agricultural machine providing a haptic feedback in such a way that an operator of the user interface is enabled to recognize and distinguish different settings, control demands and/or operating states of the agricultural machine.

According to an aspect of the invention there is provided a user interface for controlling an agricultural machine comprising a moveable input element, a feedback actuator for inducing a haptic feedback in the input element according to a force feedback characteristic. The force feedback characteristic comprises at least one ripple having an adjustable ripple characteristic. The user interface further comprises a control unit configured to adjust the ripple characteristic of the at least one ripple according to a first ripple characteristic or a second ripple characteristic being different to the first ripple characteristic.

The agricultural machine may be a vehicle or vehicle-implement combination of any type. The vehicle may generate a tractive force to tow the implement through an agricultural field. The implement may be fixed to the vehicle or detachably connected with the vehicle. The vehicle may be an agricultural vehicle such as a tractor, a harvester, a combine, a sprayer or of any other type such as a truck. The implement may be used for an operation in the agricultural field and may be of the type of a plough, a rake, a planter, a sprayer, a mower, a trailer, etc. The user interface may be installed in the agricultural machine and may be controlled by an operator. The user interface may comprise one or more input elements such a lever, a joystick, a knob or a rocker to control at least one actuator of the agricultural machine. The actuator may be of any type such as an electrical actuator such as an electric motor, a hydraulic actuator such as a hydraulic cylinder or a combination thereof such as an electrohydraulic actuator for example. The actuator may control a moveable part of the agricultural machine, e. g. a part of an implement. The feedback actuator may be of electric, piezoelectric, magnetic, hydraulic, magnetorheological, electrorheological or of any other type and generates a resistance according to the force feedback characteristic. The force feedback characteristic may define a resistance in dependence of the position of the input element. The at least one ripple of the force feedback characteristic may cause an alternating increase and decrease of the resistance. The magnitude of the resistance may be defined by a ripple resistance of the at least one ripple. The type or shape of the at least one ripple may be adjustable and may be defined by the ripple characteristic. For example, the control unit may adjust the ripple characteristic of the at least one ripple in dependence of a change of a setting, control demand and/or operating state of the agricultural machine. So, the ripple characteristic may be assigned to a specific setting, control demand and/or operating state of the agricultural machine. The operator controlling the input element may feel the resistance as haptic feedback. He would need to apply a force greater than the resistance to manually adjust the input element. Depending on the ripple characteristic assigned to the at least one ripple by the control unit, the operator may feel a different haptic feedback. Hence, the operator of the user interface may be enabled to haptically recognize and distinguish different settings, control demands and/or operating states of the agricultural machine based on the current ripple characteristic of the at least one ripple.

The control unit may be configured to adjust the ripple characteristic in response to a movement of the input element.

The movement of the input element may cause a change of a setting, control demand and/or operating state of the agricultural machine. For example, the actuator of the agricultural machine may be controlled in response to the movement of the input element and may change an operating state of the agricultural machine. Thus, the control unit may assign the ripple characteristic to the at least one ripple in dependence of a specific setting, control demand and/or operating state of the agricultural machine triggered by the operator.

The control unit may be configured to determine a set point position, and/or determine a current position of the input element.

The set point position may represent a preferred position of the input element such as a neutral position of the input element or a position of the input element assigned to a preferred position of the at least one actuator of the agricultural machine. For example, the operator may choose a position as set point position at which he intends to bring the current position of the input element into alignment with the set point position. The set point position may also be a position the operator wants to reposition the input element for multiple times. The feedback actuator may induce a resistance in the input element as haptic feedback when the current position of the input element has reached the set point position to indicate the alignment to the operator. The set point position may be manually adjusted by a setting dial (or another type of input element). The user interface may comprise a sensor element to determine the position of the setting dial and/or another sensor element to determine the position of the input element. The sensor elements may send sensor signals corresponding to the manual operation of the input elements to the control unit.

The control unit may be configured to adjust the ripple characteristic according to the second ripple characteristic if the current position of the input element diverges from the set point position.

The current position and the set point position may diverge from each other if a distance between the current position and the set point position increases for example due to an adjustment of the set point position or of the current position. For adjusting the ripple characteristic, the control unit may morph the first ripple characteristic of the at least one ripple to the second ripple characteristic. Based on whether the operator feels a force feedback according to the first or the second ripple characteristic, the operator is enabled to haptically distinguish between an operation of the input element away from the set point position or towards to the set point position.

The control unit may be configured to adjust the ripple characteristic according to the first ripple characteristic if the current position of the input element converges to the set point position.

The current position and the set point position may converge to each other if a distance between the current position and the set point position decreases for example due to an adjustment of the set point position or of the current position. For adjusting the ripple characteristic, the control unit may morph the second ripple characteristic of the at least one ripple to the first ripple characteristic.

The control unit may be configured to adjust the ripple characteristic according to the second ripple characteristic if the at least one ripple is located within an adjustment range extending between the set point position and the current position of the input element.

The adjustment range may correspond to the distance between the current position of the input element and the set point position. The adjustment range may be zero if the current position is in alignment with the set point position. The adjustment range may be extended when the current position diverges from the set point position. The adjustment range may be reduced when the current position converges with the set point position. The more the adjustment range is extended the more ripples may be covered by the adjustment range and the more ripple characteristics may be adjusted according to the second ripple characteristic.

The control unit may be configured to adjust the ripple characteristic according to the first ripple characteristic if the at least one ripple is located out of the adjustment range.

When the adjustment range changes due to an adjustment of the current position of the input element or the set point position, the number of ripples covered by the adjustment range may vary. Hence, ripples covered by the adjustment range may fall out of the adjustment range when the adjustment range is reduced. Then, such ripples are located out of the adjustment range and the ripple characteristic of these ripples is adjusted to the first ripple characteristic again. Consequently, all ripples will comprise the first ripple characteristic when the current position of the input element gets in alignment with the set point position again. Hence, the control unit adapts the ripple characteristic in dependence of any range adjustments of the adjustment range. Hence, the operator is enabled to haptically distinguish between an extension or reduction of the adjustment range.

The first or the second ripple characteristic may be U-shaped, V-shaped or W-shaped.

The feedback actuator may induce a resistance as haptic feedback according to the shape of the ripple characteristic. The ripple resistance of the V-shaped ripple characteristic may increase much smoother than the ripple characteristic of the U-shaped ripple characteristic, for example. The operator may feel the difference of the haptic feedback and may thus be enabled to haptically distinguish between an operation of the input element away from the set point position or towards to the set point position based on the different shapes of the ripple characteristics. Besides U-shaped, V-shaped or W-shaped ripple characteristics, other shapes of ripple characteristics may be possible.

The control unit may be configured to assign a set point ripple of the force feedback characteristic to the set point position and adjust the position of the set point ripple according to the adjustment of the set point position, wherein the set point position may be adjustable.

As mentioned above, the user interface may comprise a setting dial or any other input element for manually adjusting the set point position. The control unit may keep the position of the set point ripple in alignment with the set point position. For example, the set point ripple may comprise a ripple characteristic other than the other ripples so that the operator may be enabled to haptically distinguish the set point ripple from any other ripple and to haptically detect when the current position of the input element has reached the set point position while the operator is moving the input element towards the set point position.

The set point ripple has a ripple resistance being higher than a ripple resistance of a ripple adjacent to the set point ripple.

Due to the different ripple resistances, the operator may also be enabled to haptically distinguish the set point ripple from any other ripple and to haptically detect when the current position of the input element has reached the set point position while the operator is moving the input element towards the set point position.

The force feedback characteristic may comprise at least one adjustable end position ripple having a ripple resistance being higher than a ripple resistance of a ripple adjacent to the end position ripple.

Analogously to the set point ripple, the operator may define one or more end position ripples at positions he does not intend to be exceeded by the at least one actuator. The feedback actuator may induce a haptic feedback of a higher resistance when the current position of the input element reaches the position of the end position ripple similar to the set point ripple. Then, the operator may feel that the current position of the input element has reached the end position and may decide whether to move the at least one actuator further by moving the input element beyond the end position ripple or to stop movement of the actuator.

The control unit may be configured to adjust the ripple characteristic of the at least one ripple according to a third ripple characteristic or a fourth ripple characteristic being different to the third ripple characteristic.

The third and fourth ripple characteristics may be different to the first and second ripple characteristics. For example, the third ripple characteristic may comprise a shape of stairs and the fourth ripple characteristic may comprise a shape of a ramp. But also, other types of shapes are possible. Starting from the set point position, the current position of the input element may be moved in a first direction or in a second direction by operating the input element accordingly. When the input element is moved in the first direction or back, the at least one ripple may comprise the first or the second ripple characteristic. When the input element is moved in the second direction or back, the at least one ripple may comprise the third or fourth ripple characteristic. Hence, the operator is enabled to haptically distinguish an operation of the input element from the set point position in the first or second direction.

A further aspect provides an agricultural machine comprising a hitch system, and a user interface as described above. The hitch system is moveable between an upper limit and a lower limit. The control unit is configured to control a movement of the hitch system according to an operation of the user interface.

The hitch system may be used to connect an implement with the vehicle and to raise or lower the implement in relation to the vehicle. The at least one actuator may move the hitch system between the upper and lower limit according to an operation of the input element. The operator may define a set point position for a position to which he intends to move the hitch system and an end position for a position which he does not intend to be exceeded by the hitch system. Hence, the operator is enabled to haptically recognize when he controls the hitch system to move away from the set point, to move towards the set point or when the set point has been reached or when the end position has been reached.

Another aspect includes a method of adjusting a haptic feedback of a user interface. The method comprises acts for determining a set point position, determining a current position of the input element, and adjusting a ripple characteristic of at least one ripple according to a second ripple characteristic being different to a first ripple characteristic if the at least one ripple is located within an adjustment range extending between the set point position and the current position of the input element.

The control unit may be configured to carry out at least one method act of the method. Hence, when carrying out the method, the control unit may enable the operator to feel a different haptic feedback depending on the ripple characteristic assigned to the at least one ripple by the control unit. Hence, the operator of the user interface may be enabled by the control unit to recognize and distinguish different settings, control demands and/or operating states of the agricultural machine based on the current ripple characteristic of the at least one ripple.

The method may comprise an act of adjusting the ripple characteristic according to the first ripple characteristic if the at least one ripple is located out of the adjustment range.

Hence, when carrying out the method, the control unit may enable the operator to haptically distinguish between an extension or reduction of the adjustment range as described above.

The method may comprise acts of adjusting the ripple characteristic according to the second ripple characteristic if the current position of the input element diverges from the set point position, and adjusting the ripple characteristic according to the first ripple characteristic if the current position of the input element converges to the set point position.

Hence, when carrying out the method, the control unit may enable the operator to haptically distinguish between an operation of the input element away from the set point position or towards to the set point position as described above.

The method may comprise additional method acts wherein the method acts may be executed as disclosed in this application.

Within the scope of this application, it should be understood that the various aspects, embodiments, examples and alternatives set out herein, and individual features thereof may be taken independently or in any possible and compatible combination. Where features are described with reference to a single aspect or embodiment, it should be understood that such features are applicable to all aspects and embodiments unless otherwise stated or where such features are incompatible.

BRIEF DESCRIPTION OF THE DRAWINGS

Several aspects of the invention will now be described, by way of example only, with reference to the accompanying drawings, in which.

DETAILED DESCRIPTION

Figure 1:
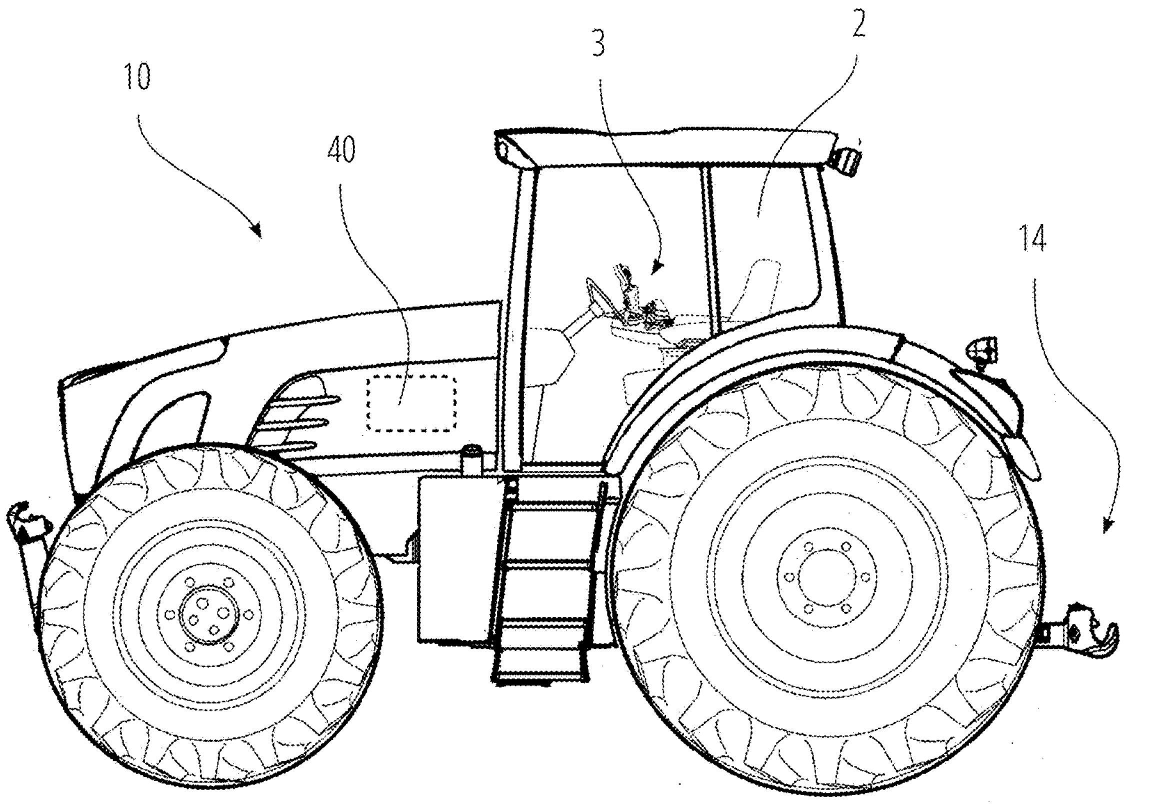
FIG. 1 illustrates an agricultural machine.
Figure 2:
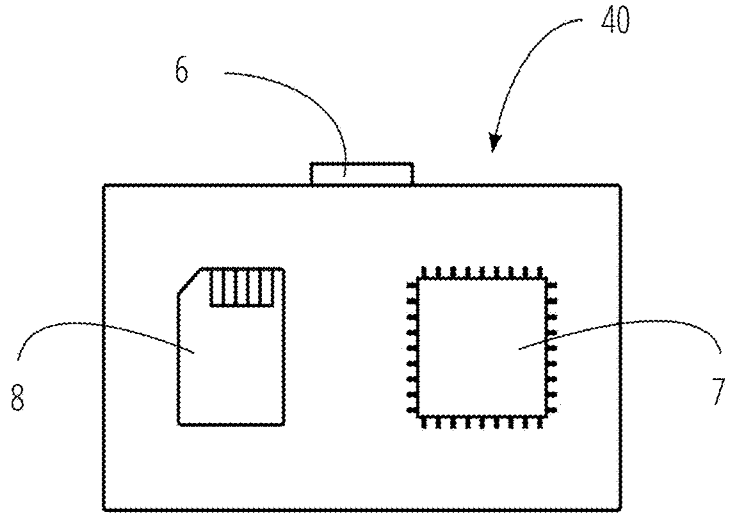
FIG. 2 illustrates a simplified view of a control unit of the agricultural machine shown in FIG. 1.

FIG. 1 shows an agricultural machine 10. The agricultural machine 10 may be a vehicle or a vehicle-implement combination. The vehicle may generate a tractive force to tow the implement through an agricultural field. The implement may be fixed to the vehicle or detachably connected with the vehicle. The vehicle may be an agricultural vehicle such as a tractor, a harvester, a combine, a sprayer or of any other type such as a truck. The implement may be used for an operation in the agricultural field and may be of the type of a plough, a rake, a planter, a sprayer, a mower, a trailer, etc. Depending on the type of the implement, the implement may comprise one or more tools such as a rake rotor, a mower knife, a seeding unit, a spray nozzle, a shovel, a dumper, etc. The agricultural machine 10 comprises a cabin 2, a user interface 3 integrated in the cabin 2, a control unit 40 as shown in FIG. 2 and a hitch system 14. The implement may be connected to the hitch system 14. The height of the implement, i.e., a distance between the implement and the agricultural field, may be raised or lowered according to an adjustment of the hitch system 14.

FIG. 2 shows the control unit 40 comprising an I/O interface 6, a controller 7 and a memory 8. The control unit 40 may receive and send signals or data via the I/O interface 6, for example to receive signal from the user interface 3 or to send control signals to the hitch system 14. The I/O interface 6 may be a wireless interface or a connector. The controller 7 may store the data or signals received by the control unit 40 in the memory 8. The memory 8 may contain additional data or executable computer program products, for example in terms of a computer-implemented method, which may be retrieved, processed or executed by the controller 7. Data or signals resulting from the processing of data or signals or from the execution of a computer program product may be stored to the memory 8 or sent to the I/O interface 6 by the controller 7.

Figure 3A:
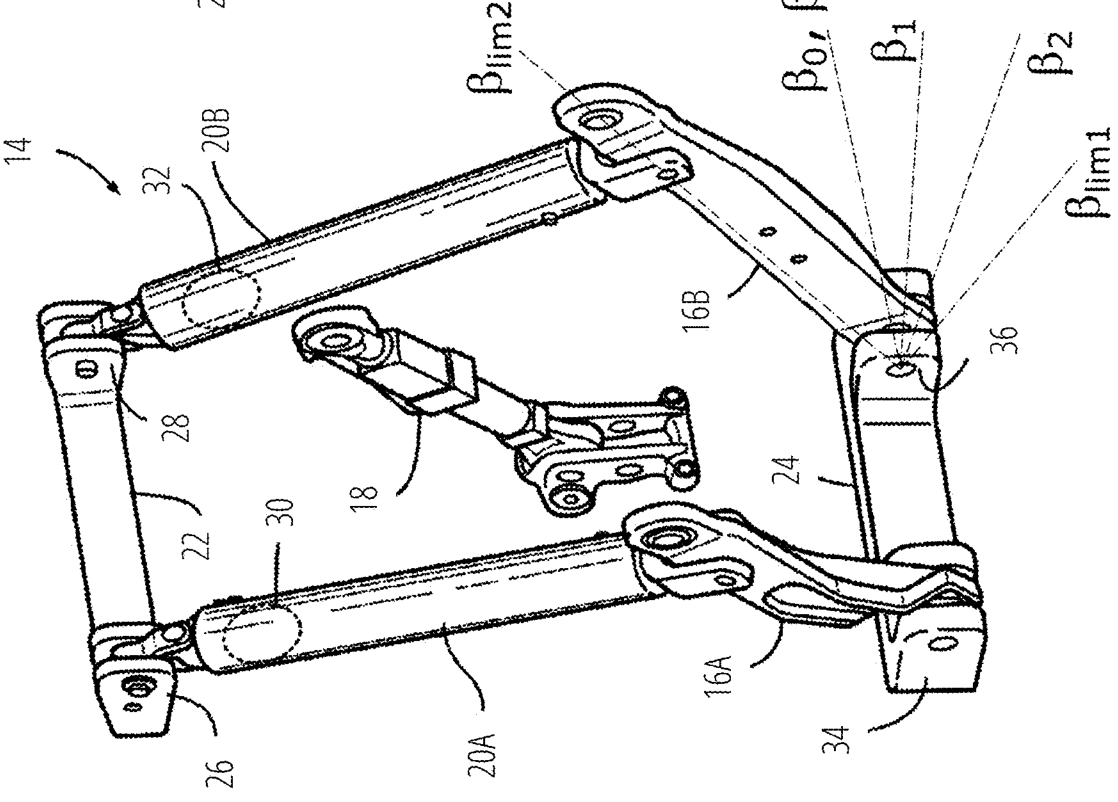
FIG. 3A illustrates a hitch system in a raised position.
Figure 3B:
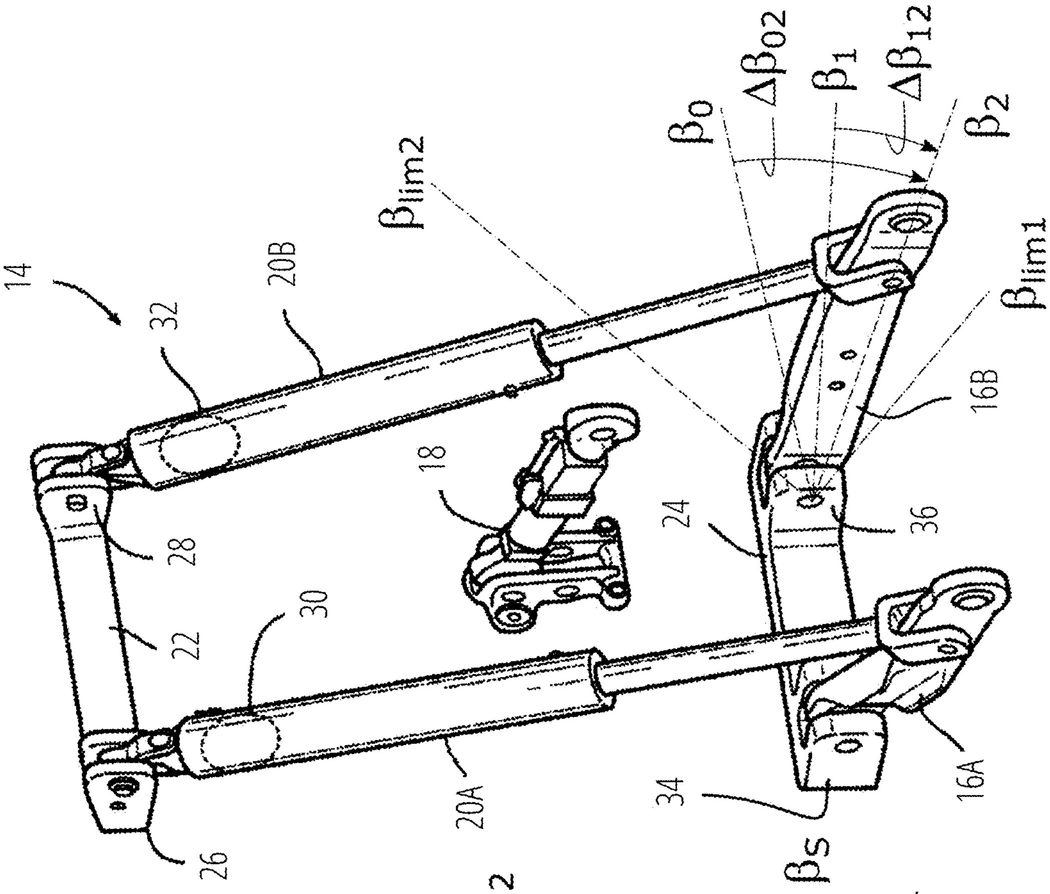
FIG. 3B illustrates a hitch system in a lowered position.

Referring to FIG. 3A and FIG. 3B, an example hitch system 14 based on a 3-point hitch linkage system is shown in a raised (FIG. 3A) and a lowered (FIG. 3B) position. Such a system is disclosed in patent application US 2017/0100974 A1, entitled "Hitch System", published on Apr. 13, 2017, which is hereby incorporated by reference in its entirety. The hitch system 14 mounts to the rear of the agricultural machine 10 via top and lower structures secured to a frame of the agricultural machine 10. An implement may be attached to the hitch system 14 via a pair of lift arms 16A and 16B and an optional center link 18 that supplements movement of the pair of lift arms 16A and 16B. For instance, the center link 18 provides added stabilization, such as when the implement is lifted from the ground. As shown in FIG. 3A and FIG. 3B, the optional center link 18 is in the raised (e. g., FIG. 3A) and lowered (e. g., FIG. 3B) position.

The hitch system 14 uses actuators 20 (e. g., actuators 20A, 20B) to provide rotational movement of a pair of lift arms 16 (e. g., lift arm 16A, 16B) for raising or lowering the hitch system 14. The actuators 20 may be embodied as hydraulic cylinders with a retractable member embodied as a piston/rod assembly (as exemplarily shown in FIG. 3A, FIG. 3B), electric actuators with a retractable member embodied as a screw, among other types of actuators. Stated otherwise, the actuators 20 may be fluid actuated (e. g., fluid comprising air or liquid), such as a hydraulic cylinder that uses hydraulic fluid, or electrically actuated. The actuators 20 may be double-acting, which generally improves stability and hence safer operation compared to a single-acting mechanism.

As shown, the hitch system 14 comprises an upper support structure 22 to which the actuators 20 are pivotably coupled, and a lower support structure 24. The pair of lift arms 16 are pivotably coupled to the lower support structure 24 and also pivotably coupled to the actuators 20. Thus, in general, one end of each of the actuators 20A and 20B are coupled respectively to the lift arms 16A and 16B through a single axis rotational joint, and the other end of the each of the actuators 20A and 20B is coupled to the upper support structure 22 (e. g., the latter serving as a three-dimensional joint and enabling a pivoting motion about a respective single point).

The upper support structure 22 is fixed to a frame of the agricultural machine 10 (FIG. 1), and comprises a metal (or other rigid, sturdy material) element with pivot mounts 26, 28 on opposing ends of the support structure 22. The pivot mounts 26, 28 may include devises, trunnion mounts, spherical bearings, among other attachment mechanisms to enable pivoting motion of each actuator 20A, 20B about a respective pivot point of the upper support structure 22. The actuator 20A is pivotably connected at one end to the pivot mount 26, and the actuator 20B is pivotably connected at one end to the pivot mount 28. The actuators 20 each comprise a retractable member (e. g., for the hydraulic cylinder, a piston/rod assembly, best shown in FIG. 3B and FIG. 4) that causes the raising (FIG. 3A) and lowering (FIG. 3B) of the hitch system 14 (e. g., through the retraction and extension, respectively, of the rod relative to the cylinder housing or barrel based on pressure differentials across the piston and rod within the housing).

Hence, the actuators 20 are moveable between an extracted position $\beta_{lim1}$ corresponding to the lowered position of the hitch system 14 (lower limit) and a retracted position $\beta_{lim2}$ corresponding to the raised position of the hitch system 14 (upper limit). Optionally, the actuator 20A may be equipped with a sensor 30 and actuator 20B with a sensor 32 (shown schematically as dotted ellipses on the cylinder housings of each actuator 20A, 20B, merely signifying residence internal to the cylinder housing) to determine a current position $\beta_C$ of each actuator 20A, 20B. I. e., the sensors 30, 32 may determine any intermediate position of the actuators 20, such as positions $\beta_s$, $\beta_0$, $\beta_1$ or $\beta_2$, when moving from the position $\beta_{lim1}$ to $\beta_{lim2}$ or vice versa. The sensors 30, 32 send signals representing the current positions $\beta_C$ of the actuators 20 to the electronic control unit 40. The sensors 30, 32 may be magnetic positional sensors integrated within the actuators 20A, 20B, detecting the position of the piston of each actuator 20. Alternatively, the sensors may be located elsewhere (e. g., external to the actuators 20), such as coupled to each of the lift arms 16A, 16B to detect a position (e. g., via a change in resistance) of the actuators 20. Alternatively, other types of sensors may be used, such as optical, acoustic, or capacitive sensors.

The actuators 20 are each pivotably coupled at the other end (e. g., the rod end) proximal to a distal end of each respective lift arm 16 (e. g., actuator 20A to lift arm 16A, actuator 20B to lift arm 16B). The lift arms 16 in turn are each pivotably coupled to the lower support structure 24. The lower support structure 24 is fixed to the frame of the agricultural machine 10 (FIG. 1), and comprises a metal (or other rigid, sturdy material) base, beam, or frame (base, beam, or frame used interchangeably for the lower support structure 24) with pivot mounts 34, 36 on opposing ends of the support structure 24. The pivot mounts 34, 36 may include devises, trunnion mounts, or spherical bearings, among other attachment mechanisms to enable independent, pivoting motion for the lift arms 16. The combination of the lower support structure 24 and lift arms 16A and 16B may be referred to as a draft arm assembly or a lower structural assembly. It is noteworthy that the hitch system 14 eliminates the need for a rock shaft, rock shaft arms, and lift links, since the actuators 20 are used in place of the previously used linkage parts. For instance, because the actuators 20 are linearly powered, the upper connection points can be fixed instead of mounting to a pivoting rock shaft and rock shaft arms.

Figure 4:
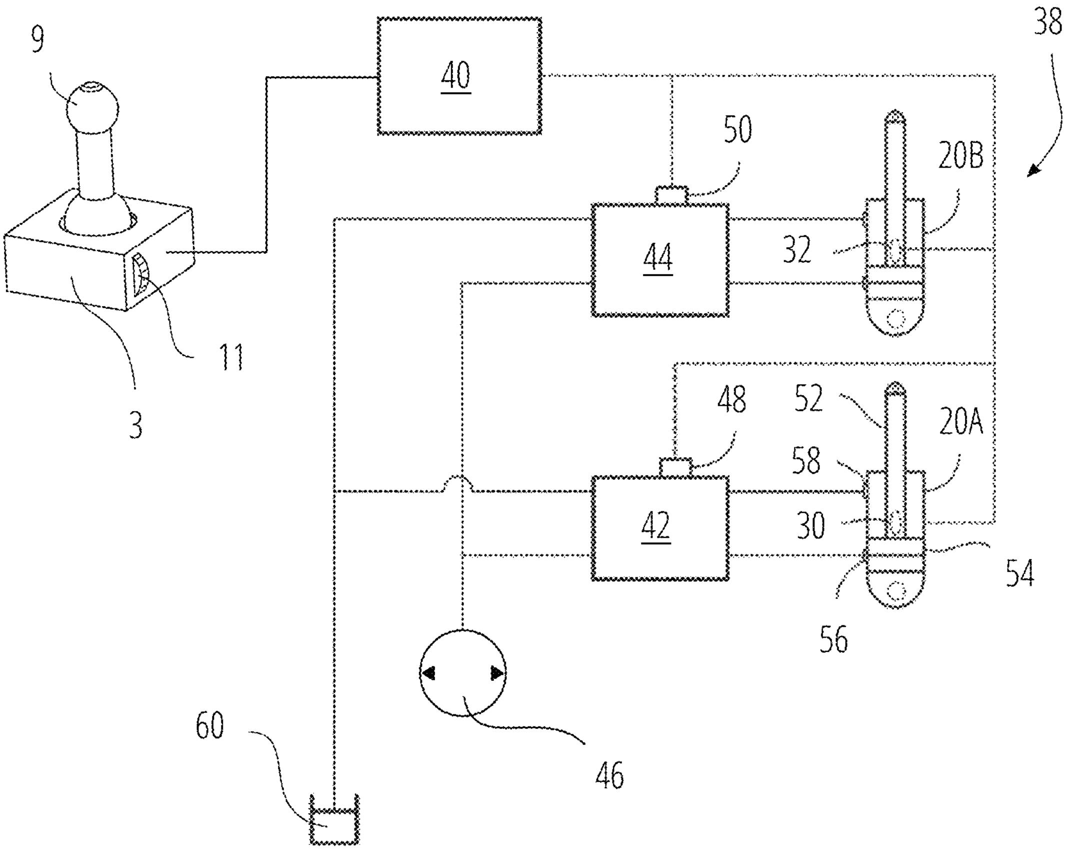
FIG. 4 is a schematic diagram illustrating a control system of the agricultural machine.

FIG. 4 illustrates a schematic of an example control system 38. Such kind of system is disclosed in patent application US 2017/0100974 A1, entitled "Hitch System", published on Apr. 13, 2017, which is hereby incorporated by reference in its entirety. The control system 38 may optionally comprise fewer components or additional components. The control system 38 comprises a user interface 3, the control unit 40, control valves 42 and 44 (e. g., multi-position, electrically-actuatable valves), the actuators 20 (20A, 20B), and the sensors 30, 32.

Digressing briefly, and in general (and not intended to be limited to this example of operation), an engine of the agricultural machine 10 (FIG. 1) is coupled to a pump drive gearbox, which in turn is coupled to a hydraulic pump 46. In some implementations, the pump 46 may be directly coupled to the engine or indirectly via a belt, pulley, chains, etc. The pump drive gearbox uses the power of the engine to drive the hydraulic pump 46. The pump 46 provides for pressurized, hydraulic fluid flow to the control valves 42, 44, which in turn independently control the flow of hydraulic fluid to the respective actuators 20A, 20B (e. g., hydraulic cylinders) via a fluid conduit(s), such as hoses, tubing, etc. The flow of fluid (e.g., hydraulic fluid in this example) throughout the control system 38 is indicated by solid lines, where a fluid circuit comprises the pump 46, the control valves 42, 44, the actuators 20A, 20B (ingress and egress via the ports of the actuators 20A, 20B), and a reservoir 60.

Electronic control of the control system 38 involves the user interface 3, the control unit 40, valve actuators 48 and 50, and the sensors 30, 32, with communication among the electronic control components represented by the dashed line in FIG. 4. Note that the communication medium may comprise a wired medium, such as multiple independent (e. g., twisted pair) wiring of a wiring harness according to a logical CAN bus configuration (e. g., CAN IS011998, ISO 11783, etc.), wherein the connected components are nodes (e. g., addressable, such as via J1939 or other mechanisms) along the bus. Alternatively, communication among electronic components may be achieved over a wireless medium (e. g., using near field communications (NFC), Bluetooth, or wireless local area network, among other protocols and/or standards, such as via IEEE 802.11, optical, acoustic, etc.). Also, a combination of wired and wireless communication among the components of FIG. 4 may be used. Optionally, one of a plurality of different forms of control may be implemented, such as electronic, pneumatic, or hydraulic control, or a combination thereof (e. g., a hybrid form of control, such as electro-hydraulic).

The user interface 3 comprises a rotatable input element 9 such as a lever. The input element 9 may be manually deflected by an operator from a neutral position $\alpha_0$ in a first direction or in a second direction to change the current position $\alpha_C$ of the input element 9 to another position, as can also be seen in FIG. 5A to FIG. 5C. Depending on the operator input, a signal representing the current position $\alpha_c$ of the input element 9 is generated by the user interface 3 and sent to the control unit 40. The control unit 40 receives the signal and determines control signals for controlling the actuators 20A and 20B accordingly. I. e., a change of the current position $\alpha_C$ of the input element 9 triggers a change of the current position $\beta_C$ of the actuators 20 for raising or lowering of the hitch system 14 (see FIG. 3A, FIG. 3B).

In addition to the input element 9, the user interface 3 comprises another input element in terms of a rotatable setting dial 11 for commanding a set point position $\alpha_S$. The set point position $\alpha_S$ may represent a preferred position of the input element 9 such as the neutral position $\alpha_0$ or a position of the input element 9 assigned to a preferred position $\beta_S$ of the actuators 20A or 20B. The setting dial 11 may be manually rotated by an operator in a first direction or in a second direction to change the set point position $\alpha_S$ between a first end position $\alpha_L$ and a second end position $\alpha_R$. Depending on the operator input, a corresponding signal representing the current set point position $\alpha_S$ of the setting dial 11 is generated by the user interface 3 and sent to the control unit 40.

The control system 38 makes use of the actuators 20A and 20B and the position sensors 30 and 32. To keep the pair of lower lift arms 16 of the 3-point hitch system 14 at the same level horizontally (e. g., if requested by an operator) without utilizing a rock shaft arm, for instance, the sensors 30, 32 feed information (e. g., relative or absolute position information via a signal(s)) to the control unit 40. Each actuator 20A, 20B is connected to the separate respective control valve 42, 44. The control unit 40 receives and uses the information from the sensors 30, 32 and the operator input at the user interface 3 to signal one or a combination of the valve actuators 48, 50 (e. g., a solenoid or other type of valve actuator), which in turn regulates the flow of hydraulic fluid through the bodies of the one or combination of control valves 42, 44. For instance, each control valve 42, 44 comprises an internal spool or poppet, and the valve actuators 48, 50 are used to actuate the spool or poppet. The control valves 42, 44 receive the pressurized fluid flow from the discharge of the pump 46, and control the manner of hydraulic fluid flow into and out of the actuators 20 based on the spool position of the control valves 42 and/or 44. Signaling from the electronic control unit 40 to either or both of the valve actuators 48, 50 causes movement of the respective spool or poppet in known manner, which in turn causes a change in hydraulic fluid flow therein. The change in flow through the control valves 42, 44 in turn regulates whether fluid is allowed to pass to the respective actuator 20A, 20B, and/or the amount and/or direction of flow of hydraulic fluid through the actuators 20A, 20B, respectively. Flow regulation through the actuators 20 results in actuation of the actuators 20 to keep the lift arms 16 at the same or substantially the same height (or in implementations where a difference in height is desired, to the operator-requested height).

In case of hydraulic actuators 20, a hydraulic cylinder (using actuator 20A as an example) comprises a cylinder barrel (housing) that houses a rod 52 and piston 54 assembly (collectively referred to as a retractable member) and comprises inlet and ports 56, 58 (where the direction of the flow into or out of each of the ports 56, 58 depends on the position of the multi-position control valve 42). The cylinder barrel is closed on one end (cap end), and open on the other end (head end) to permit the rod 52 to slide in and out of the cylinder barrel. As is known, the rod 52 and the piston 54 assembly move due to the applied force (e. g., which is a function of the pressure and area differentials on both sides of the piston 54) on the piston 54 and the amount of the flow that is directed to the hydraulic cylinder 20A. For instance, due to differences in the area on the sides of the piston 54, the hydraulic fluid flow directed to the head end generates a higher speed of the piston 54 than the same amount of hydraulic fluid directed to the cap end of the piston 54. For the same pressure of the hydraulic fluid, higher force is generated on the cap end than on the head end due to a larger area of the piston 54 on the cap end. Thus, the speed of the piston 54 depends on the flow rate and the effective area of the piston 54. The force generated by the piston 54 depends on both the pressure difference on both sides of the piston 54 and the difference in effective area on each side of the piston 54. The hydraulic fluid flow to and out of the hydraulic cylinder 20A is controlled by the control valve 42. The pressure in the cylinder chamber(s) is dependent on one or more parameters such as external load applied to the rod, inertia loads of the piston/rod assembly, the amount of flow directed by the control valve 42, among other factors.

The rod 52 and piston 54 assembly may move (e. g., extending the rod 52 past the head end of the cylinder barrel of the hydraulic cylinder 20A, or retracting the rod 52 to further within the cylinder barrel of the hydraulic cylinder 20A). The rod 52 of the hydraulic cylinder 20A couples to the lift arm 16A, and the cap end of the hydraulic cylinder 20A couples to the upper support structure 22, as described above. In effect, feedback from the sensors 30, 32 of the position of the stroke of the actuators 20 is processed by the control unit 40 to determine the corresponding height for each lift arm 16, and used for comparison with the requested height based on an operator input on the input element 9 to signal one or a combination of the valve actuators 48, 50 to control fluid flow in a manner that results in the requested height of the lift arms 16.

Figure 5A:
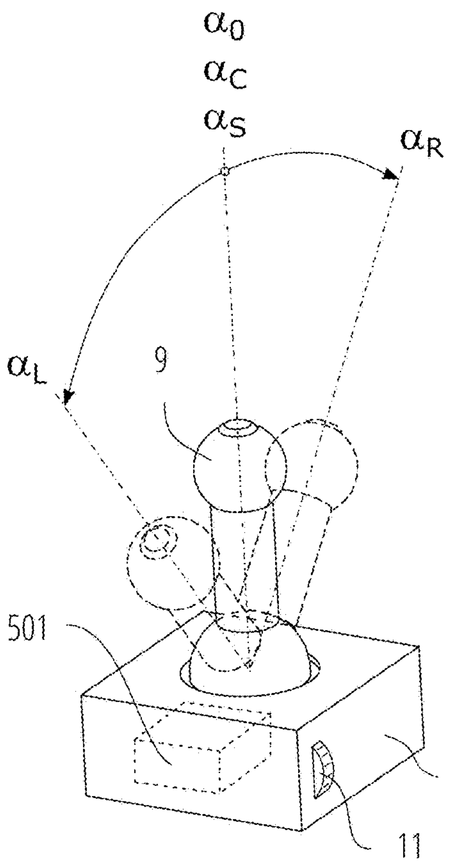
FIG. 5A illustrates a user interface.

FIG. 5A shows the user interface 3 with the rotatable input element 9 and the rotatable setting dial 11. Exemplarily, the current position $\alpha_C$ of the input element 9 corresponds to the neutral position $\alpha_0$. The input element 9 may be deflected in a first direction towards the first end position $\alpha_L$ or in a second direction towards the second end position $\alpha_R$. The first and second end position $\alpha_L$ and $\alpha_R$ may each correspond to a mechanical end stop of the input element 9. Optionally, the position of the first or second end position $\alpha_L$ or $\alpha_R$ may be adjustable. Then, depending on the position of the first or second end position $\alpha_L$ or $\alpha_R$, the input element 9 may be deflected beyond the first or second end position $\alpha_L$ or $\alpha_R$ until the input element 9 hits the mechanical end stop.

The control unit 40 receives corresponding signals from the user interface 3 and controls the actuators 20 of the hitch system 14 accordingly. For example, the actuators 20 may be extracted to lower the lift arms 16 of the hitch system 14 when the input element 9 is operated in the first direction (towards the first end position $\alpha_L$) and may be retracted to raise the lift arms 16 when the input element 9 is operated in the second direction (towards the second end position $\alpha_R$). The control system 38 may be configured in such a way that the position $\beta_{lim1}$ or $\beta_{lim2}$ will be reached when the input element 9 is deflected up to the one or the other mechanical end stop. Thus, the actuators 20 of the hitch system 14 will move according to the input on the user interface 3 and the position of the actuators 20 can be adjusted between the fully extracted position $\beta_{lim1}$ and the fully retracted position $\beta_{lim2}$. But the actuators 20 will need some time to reach the position demanded by the input on the user interface 3 since the actuators 20 may not move as fast as the input element 9 may be moved by the operator. I. e., there will be a minor time delay after the input element 9 has been moved to the current position $\alpha_C$ until the actuators 20 have reached the current position $\beta_C$ that corresponds to the current position $\alpha_C$ of the input element 9. So, the time delay may depend on response time of the control system 38 and the dynamics of the actuators 20.

As can be seen in FIG. 5A, the current set point position $\alpha_s$ may exemplarily also correspond to the neutral position $\alpha_0$. By rotating the setting dial 11, the set point position $\alpha_S$ may be adjusted between the first and second end position $\alpha_L$ and $\alpha_R$. Thus, a specific position $\beta_S$ of the actuators 20 corresponding to the set point position $\alpha_S$ can be defined.

As can also be seen in FIG. 5A, the user interface 3 comprises an integrated feedback actuator 501. The feedback actuator 501 is connected with the input element 9 and may induce a force or torque into the input element 9 as haptic feedback. The force or torque may affect a resistance against a deflection of the input element 9. The operator holding the input element 9 in his hand may feel the haptic feedback and would need to apply a manual force greater than the resistance induced by the feedback actuator 501 to overcome the resistance for deflecting the input element 9.

The feedback actuator 501 is controlled by the control unit 40 to adjust the haptic feedback according to a force feedback characteristic 602 as exemplarily illustrated in FIG. 6A to FIG. 6D. Besides other types of feedback actuators 501, the feedback actuator 501 may be an electromagnetic actuator or an electro- or magnetorheological actuator for adjusting the resistance in response to an electrical current, for example. The electrical current can be controlled by the control unit 40. I. e., the control unit 40 can increase or decrease the resistance induced in the input element 9. The force feedback characteristic 602 is determined by the control unit 40 and can be stored in the memory 8 of the control unit 40. As shown in FIG. 6A to FIG. 6D, the force feedback characteristic 602 may define a minimum resistance $F_0$ for deflecting the input element 9. The force feedback characteristic 602 comprises several ripples such as ripples 608, 610, 612, 614, 616, 618. Each ripple defines a ripple resistance for increasing the resistance of the haptic feedback over the minimum resistance $F_0$ within a defined range of deflection. The height of the ripple defines the ripple resistance, the width of the ripple defines the range of deflection for the ripple resistance. The ripple resistances may be different. For example, the ripple resistances of the ripples 608, 612, 614 and 620 correspond to a resistance $F_1$ being higher than the minimum resistance $F_0$ whereas the ripple resistances of the ripples 610, 616 and 618 correspond to a resistance $F_2$ being higher than the resistance $F_1$.

Each ripple comprises a ripple characteristic. The ripple characteristic of each ripple other than the set point ripple 610 and the first and second end position ripple 616, 618, such as ripples 608, 612 or 614, is adjustable and can be changed from a first ripple characteristic 604 to a second ripple characteristic 606 being different to the first ripple characteristic 604. As exemplarily illustrated in FIG. 6A to FIG. 6D, the first ripple characteristic 604 is U-shaped and the second ripple characteristic 606 is V-shaped but other types of shapes would be possible. Optionally, the ripple characteristic of a ripple may be changed to a third ripple characteristic 632 or a fourth ripple characteristic 634 as exemplarily illustrated in FIG. 6E. The shape of the third ripple characteristic 632 may be designed as stairs and the shape of the fourth ripple characteristic 634 may be a ramp but other types of shapes would be possible, too. The ripple characteristic of the set point ripple 610 and the first and second end position ripple 616, 618 may be U-shaped.

Ripple 610, also called set point ripple 610, is assigned to the set point position $\alpha_S$ commanded by the setting dial 11. Ripple 616, also called end position ripple 616, is assigned to the first adjustable end position $\alpha_L$ and ripple 618, also called end position ripple 618, is assigned to the second adjustable end position $\alpha_R$. Due to the higher resistance of the set point ripple 610 and the end position ripples 616 and 618 compared to the other ripples 608, 612, 614, 620, the operator can distinguish the set point ripple 610 and the end position ripples 616 and 618 from the other ripples based on the haptic feedback. Beyond the end position ripples 616 and 618, the resistance may increase according to a first limit 626 and a second limit 628 up to a maximum resistance $F_{max}$ to avoid a deflection of the input element 9 beyond the limits 626 or 628. The position of limits 626, 628 may be defined close to the first and second mechanical end stops of the input element 9 to avoid a collision against the mechanical end stops.

Figure 6A:
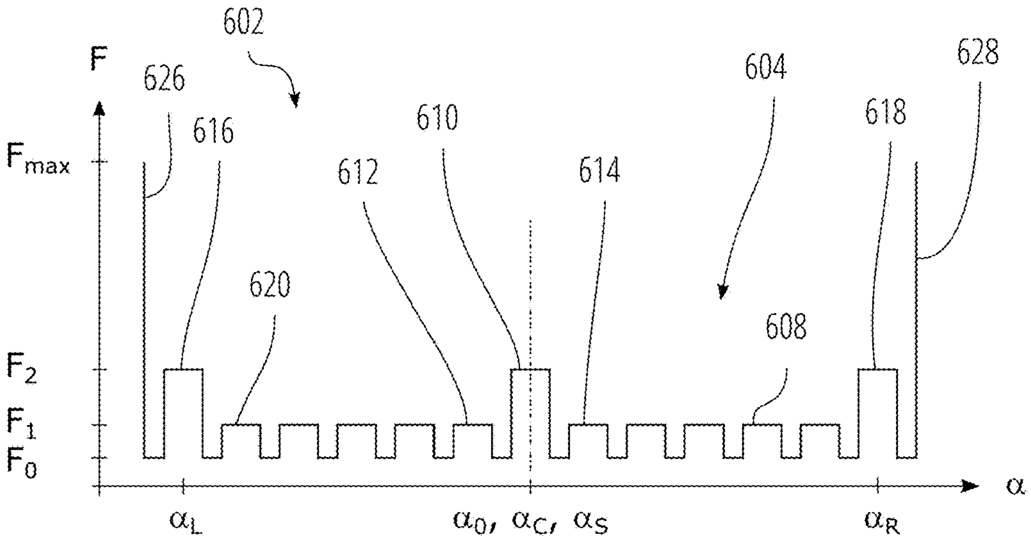
FIG. 6A illustrates a force feedback characteristic for the user interface.
Figure 6B:
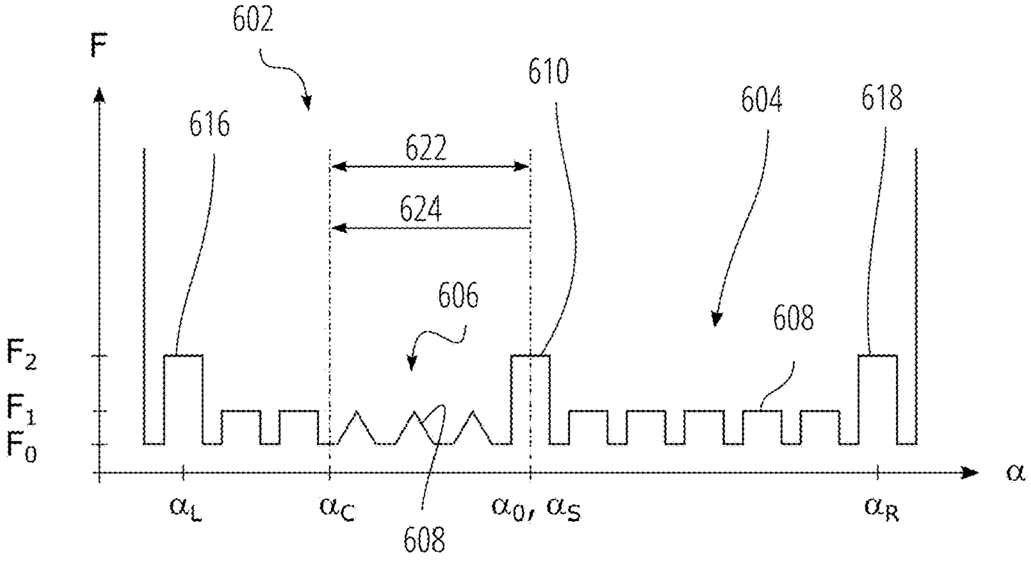
FIG. 6B illustrates a force feedback characteristic for the user interface.
Figure 6C:
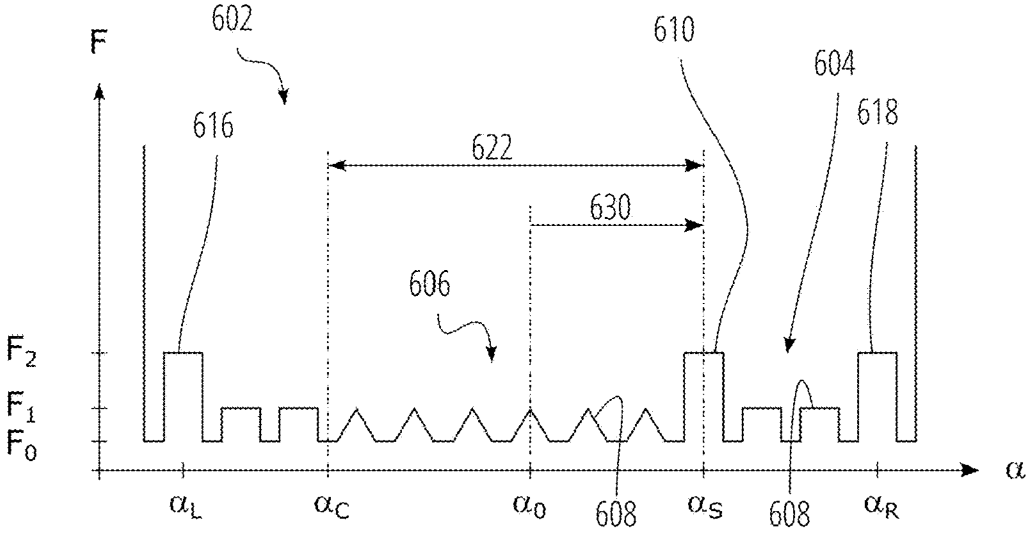
FIG. 6C illustrates a force feedback characteristic for the user interface.

As mentioned before, the positions of the ripples 610, 616 and 618 are adjustable. The position of the first and second end position ripples 616 and 618 can be adjusted between the first end second limits 626 and 628. The position of the set point ripple 610 can be adjusted between the first and second end position ripples 616 and 618. For example, the set point position $\alpha_s$ of the set point ripple 610 can be moved from the neutral position do (see FIG. 6A) to another position closer to the second end position ripple 618 as shown in FIG. 6C by rotating the setting dial 11 accordingly. Analogously, the position of the first or second end position ripple 616 or 618 may be adjusted.

When the user deflects the input element 9, the control unit 40 controls the feedback actuator 501 for inducing a resistance F according to the force feedback characteristic 602 in dependence of the current position $\alpha_C$ of the input element 9. The user will feel the resistance defined by the ripples of the force feedback characteristic 602 in respect of the current position $\alpha_C$ of the input element 9 as haptic feedback wherein the resistance alternates between the minimum resistance $F_0$ and the ripple resistance of the corresponding ripple. For instance, it is assumed that the input element 9 is in the neutral position do as shown in FIG. 5A in accordance with FIG. 6A. I. e., the current position $\alpha_C$ of the input element 9 corresponds to the neutral position $\alpha_0$ ($\alpha_C=\alpha_0$). Similarly, the set point position $\alpha_S$ corresponds to the neutral position $\alpha_0$ ($\alpha_S=\alpha_0$), too. When the operator moves the input element 9 out of the neutral position do in direction towards the first limit 626, the control unit 40 controls the feedback actuator 501 for inducing a resistance according to the ripple resistance of the set point ripple 610 that drops to the minimum resistance $F_0$ and increases afterwards to the ripple resistance of the ripple 612 located next to the set point ripple 610. The operator will feel the resistance as haptic feedback when deflecting the input element 9 accordingly.

Figure 7:
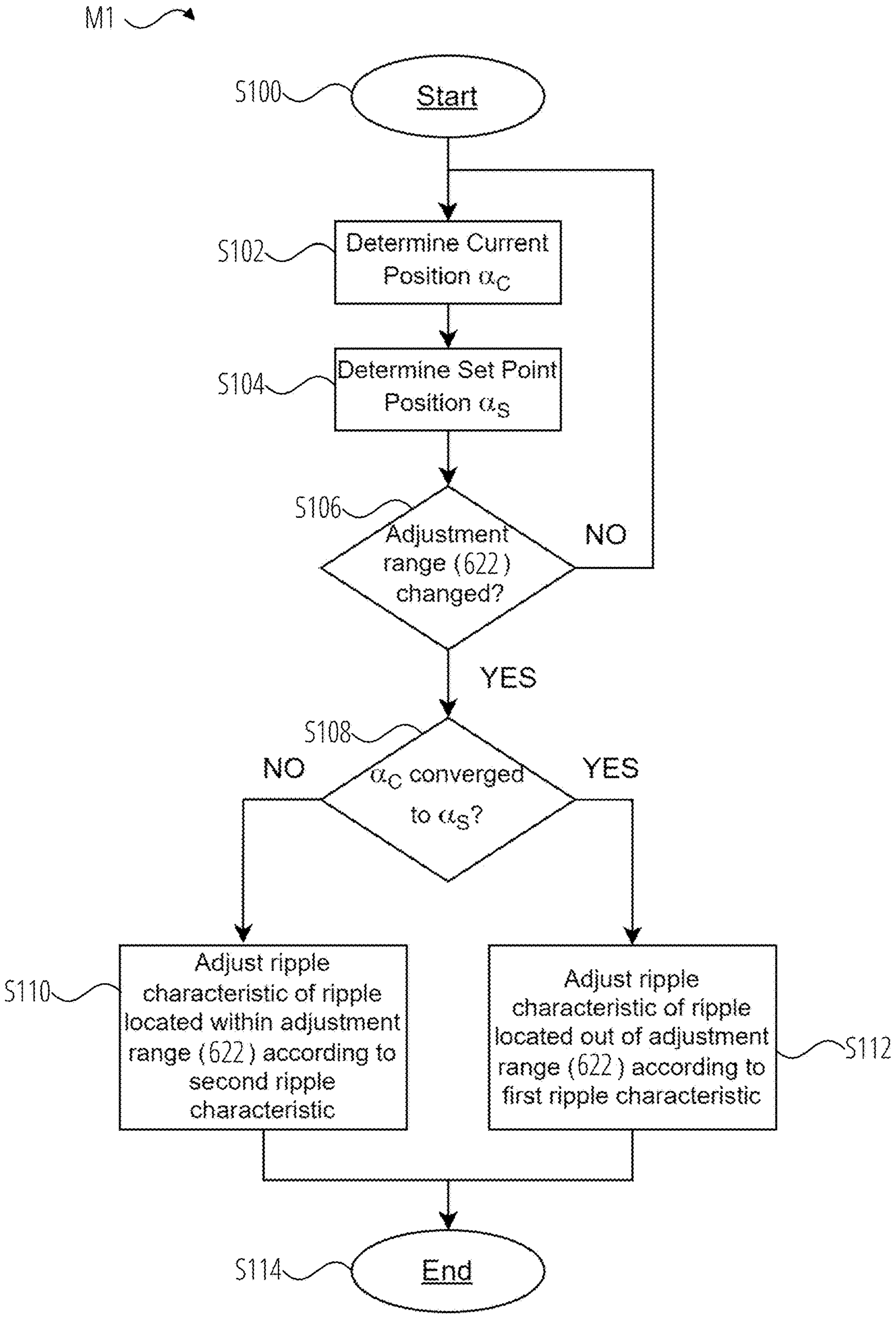
FIG. 7 illustrates a flow diagram for a method.

In response to the deflection of the input element 9, the control unit 40 may adjust the ripple characteristic 604 of the force feedback characteristic 602 according to a method M1 for adjusting a haptic feedback of a user interface as illustrated by the flow chart of FIG. 7. The method may be at least partly a computer-implemented method stored as a computer program product in the memory 8 of the control unit 40. The control unit 40 is configured to carry out the method. Computer-implemented parts of the method may be executed by the controller 7 of the control unit 40. Non-computer-implemented parts of the method may be executed manually or by other components of the system. The method is described by way of example of several acts without any restriction in respect of these acts. I. e. the number or the order of acts may be adapted, for example single acts may be excluded and/or added and executed earlier or later than described. The method M1 starts with act S100 and proceeds to act S102.

Figure 5B:
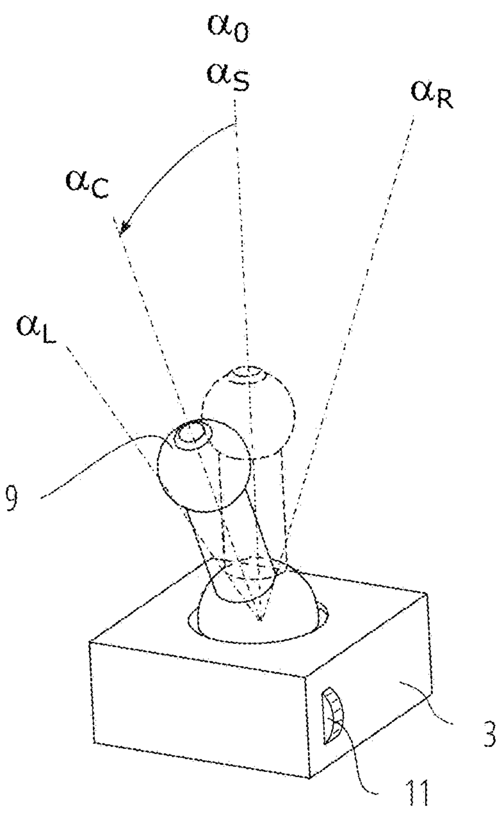
FIG. 5B illustrates the user interface.

At act S102, the control unit 40 determines the current position $\alpha_C$ of the input element 9 by receiving a corresponding signal from the user interface 3. For instance, as a first operation of the user interface 3, the input element 9 has been deflected from the set point position $\alpha_S$ corresponding with the neutral position $\alpha_0$ to the current position $\alpha_C$ as shown in FIG. 5B.

Figure 5C:
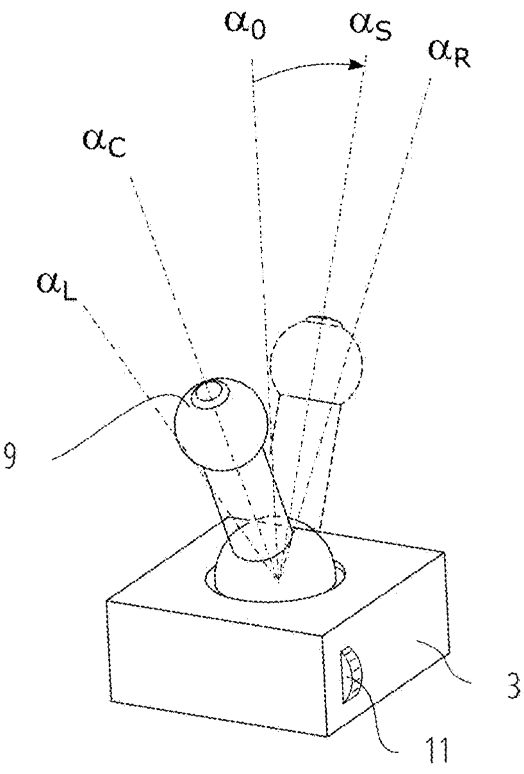
FIG. 5C illustrates the user interface.

Then, the method proceeds to act S104 and the control unit 40 determines the set point position $\alpha_S$ of the setting dial 11 by receiving a corresponding signal from the user interface 3. For instance, as a second operation of the user interface 3 after the first operation, the setting dial 11 has been rotated to move the set point from the neutral position $\alpha_0$ to the set point position $\alpha_S$ in a direction opposite to the movement of the current position $\alpha_C$ as shown in FIG. 5C.

At act S106, the control unit 40 checks whether an adjustment range 622 between the set point position $\alpha_s$ and the current position $\alpha_C$ of the input element 9 has been changed. This is the case if the current position $\alpha_C$ has been adjusted due to a deflection of the input element 9 or if the set point position $\alpha_S$ has been adjusted due to a rotation of the setting dial 11. If the adjustment range 622 has been adjusted, the method proceeds to act S108. If not, the method jumps back to act S102.

Due to a change, the adjustment range 622 may be increased or reduced. As exemplarily shown in FIG. 6B in comparison with FIG. 6A, the adjustment range 622 has been increased due to an adjustment 624 of the position of the input element 9 from the set point position $\alpha_S$ to the current position $\alpha_C$ in response to the deflection of the input element 9 as determined in act S102 and shown in FIG. 5B. As exemplarily shown in FIG. 6C in comparison with FIG. 6B, the adjustment range 622 has been additionally increased due to an adjustment 630 of the position of the set point from the neutral position $\alpha_0$ to the set point position $\alpha_S$ in response to the rotation of the setting dial 11 as determined in act S104 and shown in FIG. 5C.

At act S108, the control unit 40 checks whether the current position $\alpha_C$ has converged to the set point position $\alpha_S$. The current position $\alpha_C$ converges to the set point position $\alpha_S$ if the adjustment range 622 is reduced. Otherwise, the current position $\alpha_C$ diverges from the set point position $\alpha_S$ if the adjustment range 622 is increased as exemplarily shown in FIG. 6B and FIG. 6C. If the current position $\alpha_C$ has converged to the set point position $\alpha_S$, the method proceeds to act S112. Otherwise, the method proceeds to act S110.

At act S110, the control unit 40 adjusts the ripple characteristics of all ripples located within the adjustment range 622 by changing the ripple characteristic from the first ripple characteristic 604 to the second ripple characteristic 606. For example, the control unit 40 may morph the ripple characteristic of a ripple from one ripple characteristic to the other ripple characteristic. As illustrated in FIG. 6B, the adjustment range 622 covers three ripples 608 due to the adjustment 624 of the position of the input element 9 according to the first operation (see FIG. 5B) as determined at act S102. Before the input element 9 has been moved away from the set point position $\alpha_S$, these three ripples 608 comprised the first ripple characteristic 604 (see FIG. 6A). Consequently, the ripple characteristic of the ripples located within the adjustment range 622 has been morphed by the control unit 40 to the second ripple characteristic 606. While the operator is deflecting the input element 9, the control unit 40 may continuously morph the ripple characteristic ripple by ripple instead of morphing the ripple characteristics of all three ripples at once. The ripple characteristic of the other ripples have remained unchanged since the other ripples are out of the adjustment range 622.

Based on the adjusted force feedback characteristic 602 according to FIG. 6B, the operator will still feel a haptic feedback according to the first ripple characteristic 604 when he deflects the input element 9 from the current position $\alpha_C$ further to the first limit 626. But he will feel a different haptic feedback according to the second ripple characteristic 606 when he deflects the input element 9 towards the set point position $\alpha_S$. Hence, the operator is enabled to haptically distinguish between an operation of the input element 9 away from the set point position $\alpha_s$ or towards to the set point position $\alpha_S$.

Due to the additional increase of the adjustment range 622 in response to the adjustment 630 of the position of the set point by the setting dial 11 from the neutral position $\alpha_0$ to the set point position $\alpha_S$ (see FIG. 5C), the control unit 40 also morphs the ripple characteristic of the ripples located between the neutral position $\alpha_0$ and the adjusted set point position $\alpha_S$ from the first ripple characteristic 604 to the second ripple characteristic 606 as shown in FIG. 6C. Hence, the ripple characteristic of all six ripples covered by the adjustment range 622 have been morphed to the second ripple characteristic 606. While the operator is rotating the setting dial 11, the control unit 40 may continuously morph the ripple characteristic ripple by ripple instead of morphing the ripple characteristics of the ripples at once. The ripple characteristic of the other ripples has remained unchanged since the other ripples are out of the adjustment range 622.

As can also be seen in FIG. 6C, the position of the set point ripple 610 has been adjusted by the control unit 40 according to the adjustment 630 of the set point position as in response to the operation of the setting dial 11. After act S110, the method ends (act S114).

Figure 6D:
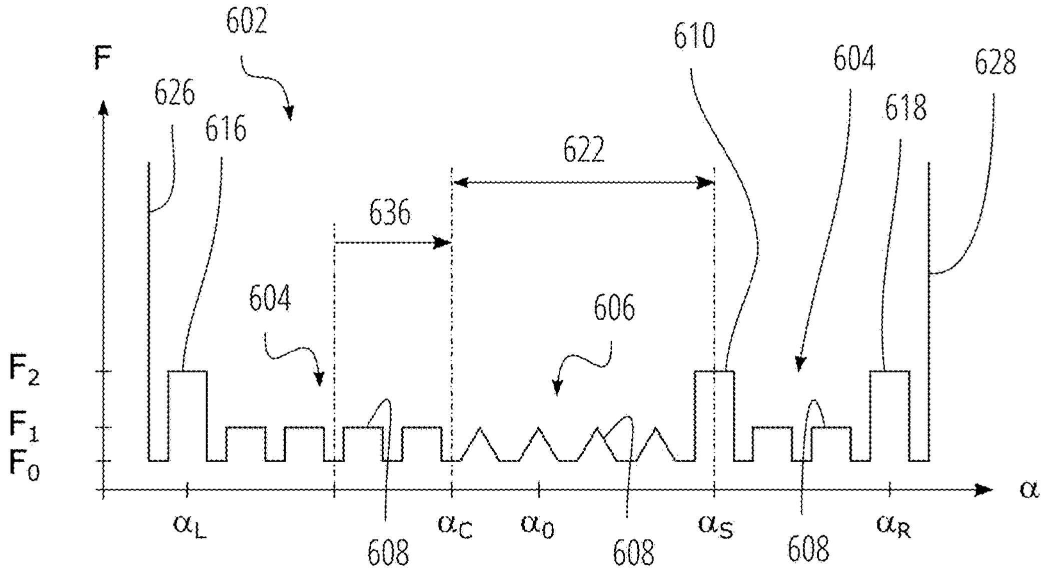
FIG. 6D illustrates a force feedback characteristic for the user interface.

The method M1 may be restarted again (act S100) and proceed to act S102 for determining the current position $\alpha_C$ of the input element 9 analogously as described above. For instance, as a third operation of the user interface 3, the input element 9 has been deflected from the current position $\alpha_C$ as shown in FIG. 5C/FIG. 6C to a current position $\alpha_C$ as shown in FIG. 6D and indicated by adjustment 636. The setting dial 11 may have not been operated by the user so that the control unit 40 will determine the set point position $\alpha_S$ of the setting dial 11 at method act S104 as shown in FIG. 6D. The method proceeds to act S106 again and the control unit 40 determines analogously as described above whether the adjustment range 622 between the set point position $\alpha_S$ and the current position $\alpha_C$ of the input element 9 has been changed.

As exemplarily shown in FIG. 6D in comparison with FIG. 6C, the adjustment range 622 has been reduced due to the adjustment 636 of the position of the input element 9 from the current position $\alpha_c$ as shown in FIG. 6C to the current position $\alpha_c$ as shown in FIG. 6D. Thus, the control unit 40 detects at method act S108 that the current position $\alpha_C$ has converged to the set point position $\alpha_S$. Consequently, the method proceeds to act S112.

At act S112, the control unit 40 adjusts the ripple characteristics of all ripples located out of the adjustment range 622 by morphing the ripple characteristic from the second ripple characteristic 606 back to the first ripple characteristic 604. Due to the adjustment 636 of the position of the input element 9, the number of ripples covered by the adjustment range 622 has been reduced from six ripples (see FIG. 6C) to four ripples as illustrated in FIG. 6D. I. e., two ripples have fallen out of the adjustment range 622. Consequently, the control unit 40 has morphed the ripple characteristics of these two ripples from the second ripple characteristic 606 back to the first ripple characteristic 604. While the operator is deflecting the input element 9, the control unit 40 may continuously morph the ripple characteristic ripple by ripple instead of morphing the ripple characteristics of the two ripples at once. The ripple characteristic of the other ripples has remained unchanged. After act S110, the method ends (act S114).

Figure 6E:
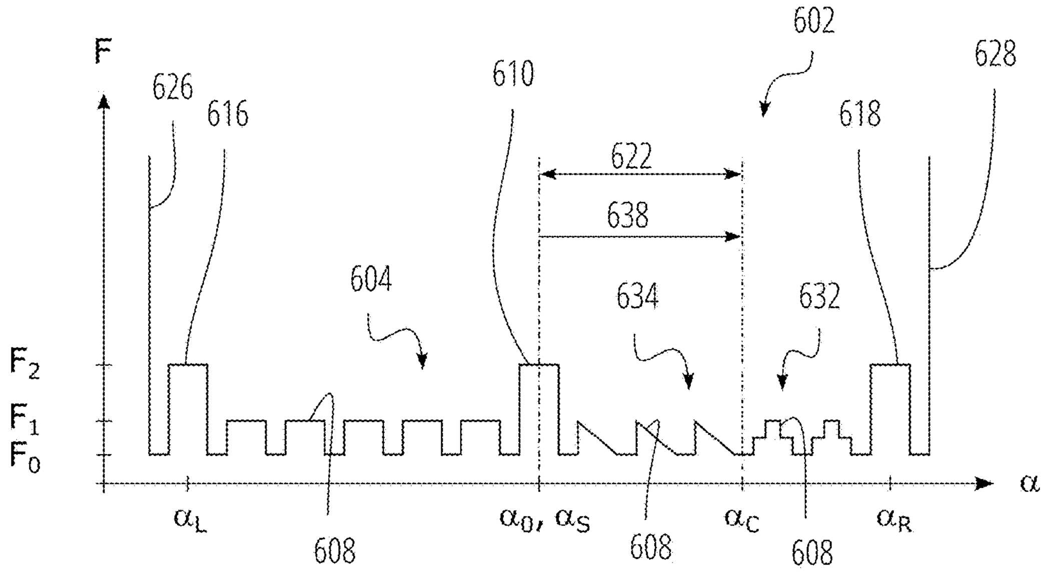
FIG. 6E illustrates a force feedback characteristic for the user interface.

For instance, as a fourth operation of the user interface 3, the operator may deflect the input element 9 from the set point position $\alpha_S$ in the second direction towards the second limit 628 as indicated by adjustment 638 in FIG. 6E (i.e., in the opposite direction as shown in FIG. 5B). In such a case, the control unit 40 may morph the ripple characteristics of each ripple 608 located within the adjustment range 622 from the first ripple characteristic to the second ripple characteristic analogously as described above.

Alternatively, all ripples 608 between the set point position $\alpha_S$ and the first limit 626 may comprise the first ripple characteristic (e. g. U-shaped ripples) and all ripples 608 between the set point position $\alpha_S$ and the second limit 628 may comprise a third ripple characteristic (e. g. stairs-shaped ripples) when the input element 9 is positioned at the set point position $\alpha_S$ (with exception of the end position ripples 616 and 618). Then, the operator is enabled to haptically distinguish an operation of the input element 9 from the set point position $\alpha_S$ in the first or second direction due to the different ripple characteristics. As can be seen in FIG. 6E, the control unit 40 may optionally adjust the ripple characteristics of all ripples located within the adjustment range 622 by morphing the ripple characteristic from the third ripple characteristic 632 to the fourth ripple characteristic 634 (when executing method act S110). As illustrated, the adjustment range 622 covers three ripples 608 due to the adjustment 638 of the position of the input element 9 according to the fourth operation. Before the input element 9 has been moved away from the set point position $\alpha_S$, these three ripples 608 comprised the third ripple characteristic 632. Consequently, the ripple characteristic of the ripples located within the adjustment range 622 has been morphed by the control unit 40 to the fourth ripple characteristic 634. While the operator is deflecting the input element 9, the control unit 40 may continuously morph the ripple characteristic ripple by ripple instead of morphing the ripple characteristics of all three ripples at once. The ripple characteristic of the other ripples has remained unchanged since the other ripples are out of the adjustment range 622.

Based on the adjusted force feedback characteristic 602 according to FIG. 6E, the operator will still feel a haptic feedback according to the third ripple characteristic 632 when he deflects the input element 9 from the current position $\alpha_c$ further to the second limit 628. But he will feel a different haptic feedback according to the fourth ripple characteristic 634 when he deflects the input element 9 back towards the set point position $\alpha_S$. Hence, the operator is enabled to haptically distinguish between an operation of the input element 9 away from the set point position $\alpha_S$ or towards to the set point position $\alpha_S$ as well as to haptically distinguish an operation of the input element 9 from the set point position $\alpha_S$ in the first or second direction.

In response to the deflection of the input element 9, the actuators 20A and 20B are controlled by the control unit 40 to adjust the position of the hitch system 14 accordingly (see FIG. 3A, FIG. 3B, FIG. 4). As mentioned above, the actuators 20 are moveable between the extracted position $\beta_{lim1}$ and the retracted position $\beta_{lim2}$. When the input element 9 is operated, a target position $\beta_T$ is demanded to which the actuators 20 shall be moved to. The target position $\beta_T$ correlates with the current position $\alpha_C$ of the input element 9. If the current position $\alpha_C$ correlates with the neutral position $\alpha_0$ of the input element 9, the target position $\beta_T$ correlates with a middle position $\beta_0$ of the actuators 20 correlating with the neutral position $\alpha_0$. If the input element 9 is deflected out of the neutral position $\alpha_0$ in the first direction (see FIG. 5B), a target position correlating with the current position $\alpha_C$ for extracting the actuators 20 is demanded. Instead, if the input element 9 is deflected out of the neutral position $\alpha_0$ in the second direction, a target position correlating with the current position $\alpha_C$ for retracting the actuators 20 is demanded.

In response to the demanded target position $\beta_T$, the control unit 40 controls the actuators 20 to move from a current position $\beta_C$ of the actuators 20 to the target position $\beta_T$. As shown in FIG. 3A, the current position $\beta_C$ of the actuators 20 corresponds to the retracted position $\beta_{lim2}$. If the target position $\beta_T$ corresponds with the position $\beta_2$, the actuators 20 will be moved from the current position $\beta_C$ as shown in FIG. 3A to the position $\beta_2$. When the actuators 20 have reached the position $\beta_2$, the current position $\beta_C$ of the actuators 20 will correspond to the position $\beta_2$ as shown in FIG. 3B. The time delay t needed to adjust the position of the actuators 20 from the current position $\beta_C$ to the target position $\beta_T$ depends on the response time of the control system 38, the dynamics of the actuators 20 and the load to be carried by the hitch system 14. For example, in case of an unloaded hitch system 14, it will take about 2 seconds to move the actuators 20 from the extracted position $\beta_{lim1}$ to the retracted position $\beta_{lim2}$. I. e., the position of the input element 9 may adjusted by the operator much faster than the position of the actuators 20 can be adjusted.

Figure 8A:
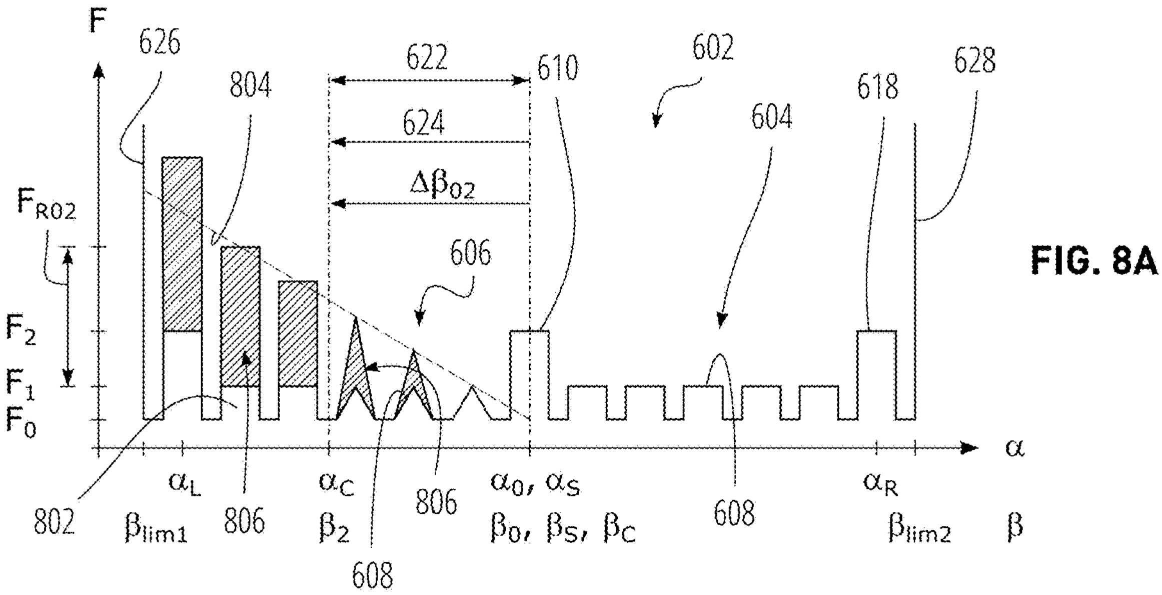
FIG. 8A illustrates a force feedback characteristic for the user interface.

It is assumed now, that the current position $\beta_C$ of the actuators 20 corresponds with the middle position $\beta_0$. In accordance with the first operation of the user interface 3 (see FIG. 5B, FIG. 6B), the input element 9 may be deflected according to the adjustment 624 in the first direction from the neutral position $\alpha_0$ to the current position $\alpha_C$ as shown in FIG. 8A. Hence, the ripple characteristic of the ripples 608, 802 located within the adjustment range 622 will be changed from the first ripple characteristic 604 to the second ripple characteristic 606 according to the method M1 as described above. In addition, a target position $\beta_T$ of the actuators 20 correlating with the current position $\alpha_C$ of the input element 9 is demanded wherein the target position $\beta_T$ corresponds to the position $\beta_2$ shown in FIG. 3A and FIG. 3B (i.e., $\beta_T=\beta_2$). As consequence, the actuators 20 will move during the time delay t from the middle position $\beta_0$ (=current position $\beta_C$) to the target position $\beta_T=\beta_2$.

Figure 10:
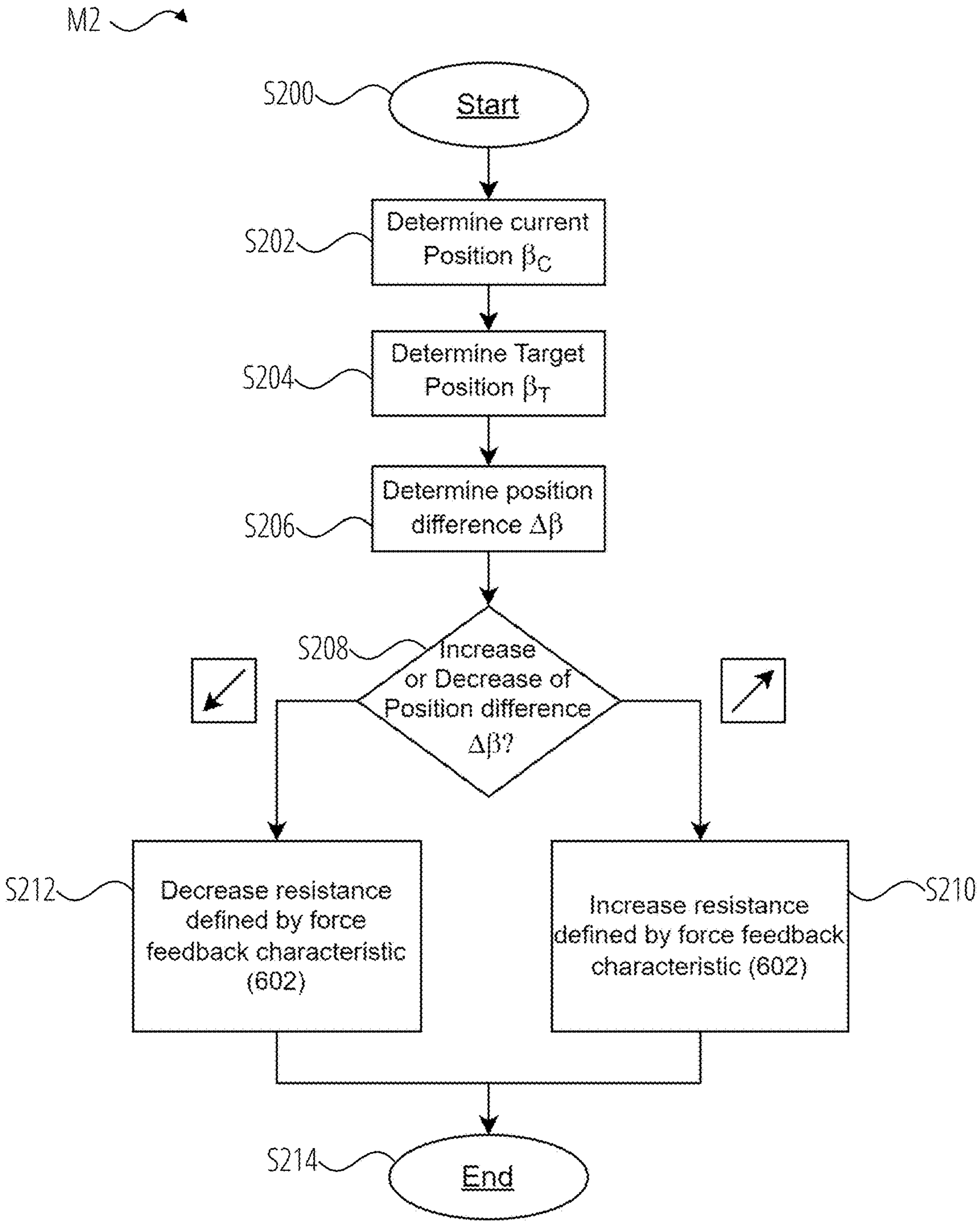
FIG. 10 illustrates a flow diagram for another method.

In response to the deflection of the input element 9, the control unit 40 may adjust the ripple characteristic 604 of the force feedback characteristic 602 according to a method M2 for adjusting a haptic feedback of a user interface as illustrated by the flow chart of FIG. 10. The method may be at least partly a computer-implemented method stored as a computer program product in the memory 8 of the control unit 40. The control unit 40 is configured to carry out the method. Computer-implemented parts of the method may be executed by the controller 7 of the control unit 40. Non-computer-implemented parts of the method may be executed manually or by other components of the system. The method is described by way of example of several acts without any restriction in respect of these acts. I. e. the number or the order of acts may be adapted, for example single acts may be excluded and/or added and executed earlier or later than described. The method M2 starts with act S200 and proceeds to act S202.

At act S202, the control unit 40 determines the current position $\beta_C$ of the actuators 20 by receiving corresponding signals from the sensor 30 assigned to actuator 20A and sensor 32 assigned to actuator 20B. As shown in FIG. 8A, the current position $\alpha_C$ corresponds to position $\beta_0$.

The method proceeds to act S204 and the control unit 40 determines the target position $\beta_T$. The target position $\beta_T$ corresponds to position $\beta_2$ correlating with the current position $\beta_C$ of the input element 9 (see FIG. 8A). According to the first operation of the user interface 3, the input element 9 has been deflected from the set point position $\alpha_S$ corresponding with the neutral position $\alpha_0$ to the current position $\alpha_C$. In response to the deflection of the input element 9, the control unit 40 receives a signal from the user interface 3 corresponding to the current position $\alpha_C$.

The method proceeds to act S206 and the control unit 40 determines a position difference $\Delta\beta$ between the current position $\beta_C$ of the actuators 20 and the target position $\beta_T$ of the actuators 20. In accordance with FIG. 8A, the control unit 40 determines position difference $\Delta\beta_{02}$ as position difference between the current position $\beta_C$ corresponding with position $\beta_0$ of the actuators 20 and the target position $\beta_T$ corresponding with position $\beta_2$.

The method proceeds to act S208 and the control unit 40 checks whether the position difference $\Delta\beta$, here position difference $\Delta\beta_{02}$, has been increased or decreased. The position $\Delta\beta$ increases if the target position $\beta_T$ of the actuators 20 and the current position $\beta_C$ of the actuators 20 diverge from each other, e. g. due to an operation of the input element 9 for moving the target position $\beta_T$ away from the current position $\beta_C$ of the actuators 20. Instead, the position $\Delta\beta$ decreases if the target position $\beta_T$ of the actuators 20 and the current position $\beta_C$ of the actuators 20 converge to each other, e. g. due to an operation of the input element 9 for moving the target position $\beta_T$ towards the current position $\beta_C$ of the actuators 20. If the position difference $\Delta\beta$ has been increased, the method proceeds to act S210. If the position difference $\Delta\beta$ has been decreased, the method proceeds to act S212.

According to FIG. 8A, the position difference $\Delta\beta$ has been increased according to position difference $\Delta\beta_{02}$. Thus, the method proceeds to act S210.

At act S210, the control unit 40 increases the resistance defined by the force feedback characteristic 602 as shown in FIG. 6B. Dependent on whether the current position $\alpha_C$ of the input element 9 is located between the current position $\beta_C$ of the actuators 20 and the first limit 626 correlating with the extracted position $\beta_{lim1}$ or between the current position $\beta_C$ of the actuators 20 and the second limit 628 correlating with the retracted position $\beta_{lim2}$, the control unit 40 increases the ripple resistance of each ripple 608, 802 located between the current position $\beta_C$ of the actuators 20 and the first limit 626 or between the current position $\beta_C$ of the actuators 20 and the second limit 628 accordingly. As can be seen in FIG. 8A (and FIG. 8B), the current position $\alpha_C$ of the input element 9 is located between the current position $\beta_C$ of the actuators 20 and the first limit 626. Thus, the control unit 40 increases the ripple resistance of each ripple 608, 802 located between the current position $\beta_C$ of the actuators 20 and the limit 626.

The ripple resistances are increased by ripple additions 806. The ripple addition 806 may comprise the same ripple characteristic 604, 606 as the ripple 608, 802 increased by the corresponding ripple addition 806. The more a ripple 608, 802 is distant from the current position $\beta_C$ of the actuators 20, the more the ripple resistance of this ripple 608, 802 is increased by the corresponding ripple addition 806. Additionally, the greater the position difference $\Delta\beta$ is (see position difference $\Delta\beta_{02}$ in FIG. 8A and position difference $\Delta\beta_{12}$ in FIG. 8B), the more the ripple resistance of the ripples 608, 802 may be increased by the corresponding ripple addition 806, too. I. e., the more the current position $\beta_C$ of the actuators 20 is away from the target position $\beta_T$ of the actuators 20, the more the ripple resistance of the ripples 608, 802 may be increased by the corresponding ripple addition 806. Vice versa, the closer the current position $\beta_C$ of the actuators 20 is to the target position $\beta_T$ of the actuators 20, the less the ripple resistance of the ripples 608, 802 may be increased by the corresponding ripple addition 806. I. e., the control unit 40 adjusts the resistance defined by the force feedback characteristic 602 in dependence of the position difference $\Delta\beta$. Hence, the resistance of the haptic feedback corresponds to the distance between the current position $\beta_C$ and the target position $\beta_T$ of the actuators 20. Thus, the user interface 3 enables the operator to feel how far the current position $\beta_C$ of the actuators 20 is away from and the target position $\beta_T$.

Figure 8B:
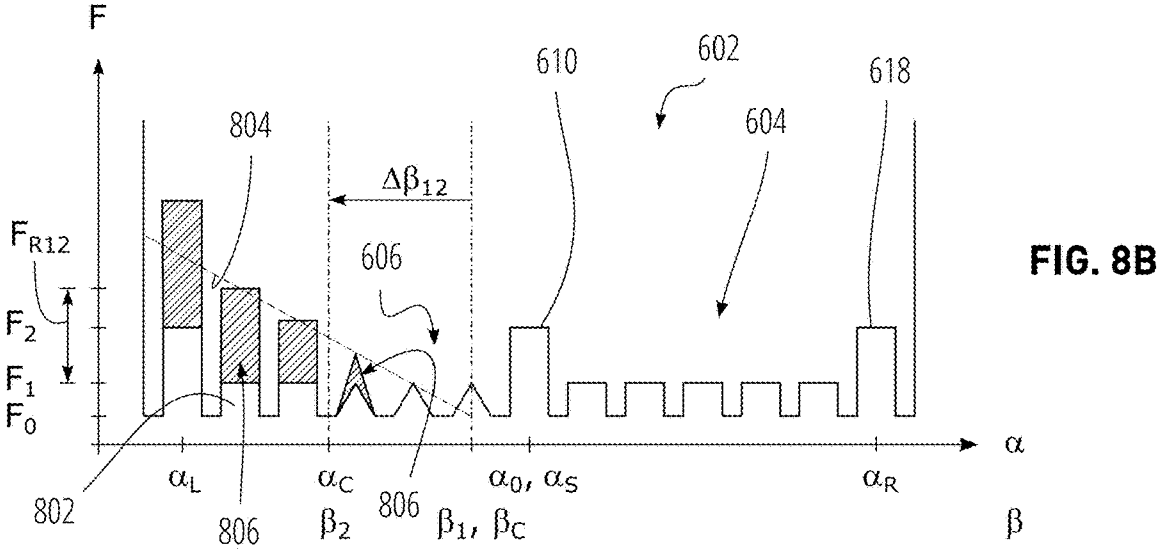
FIG. 8B illustrates a force feedback characteristic for the user interface.
Figure 9:
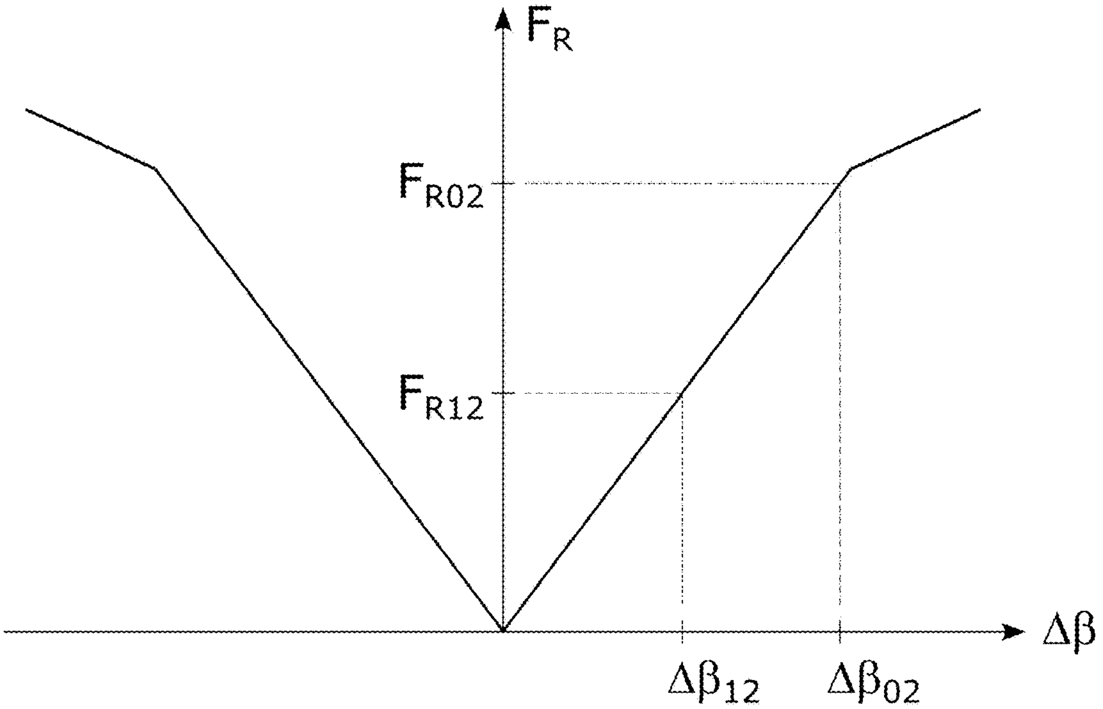
FIG. 9 illustrates a force diagram.

These facts are also illustrated in terms of a diagram of FIG. 9. The control unit 40 determines a resistance $F_R$ in dependence of a position difference $\Delta\beta$ between the current position $\beta_C$ of the actuators 20 and the target position $\beta_T$ of the actuators 20. The values of the position differences $\Delta\beta$ and the corresponding resistances $F_R$ may be stored in terms of a look-up table in the memory 8 of the control unit 40. The resistance $F_R$ increases with increasing position difference $\Delta\beta$. For the position difference $\Delta\beta_{02}$, the control unit 40 determines a resistance $F_{R02}$. In case of position difference $\Delta\beta_{12}$ being smaller than position difference $\Delta\beta_{02}$, the control unit 40 determines a resistance $F_{R12}$ being lower than resistance $F_{R02}$. As can be seen in FIG. 8A directed to a position difference $\Delta\beta_{02}$, the ripple addition 806 of ripple 802 may correspond to the resistance $F_{R02}$ whereas in FIG. 8B directed to a position difference $\Delta\beta_{12}$, the ripple addition 806 of ripple 802 may correspond to the resistance $F_{R12}$ instead. Analogously, the control unit 40 can determine a resistance $F_R$ for each ripple addition 806 of the other ripples 608.

Figure 8C:
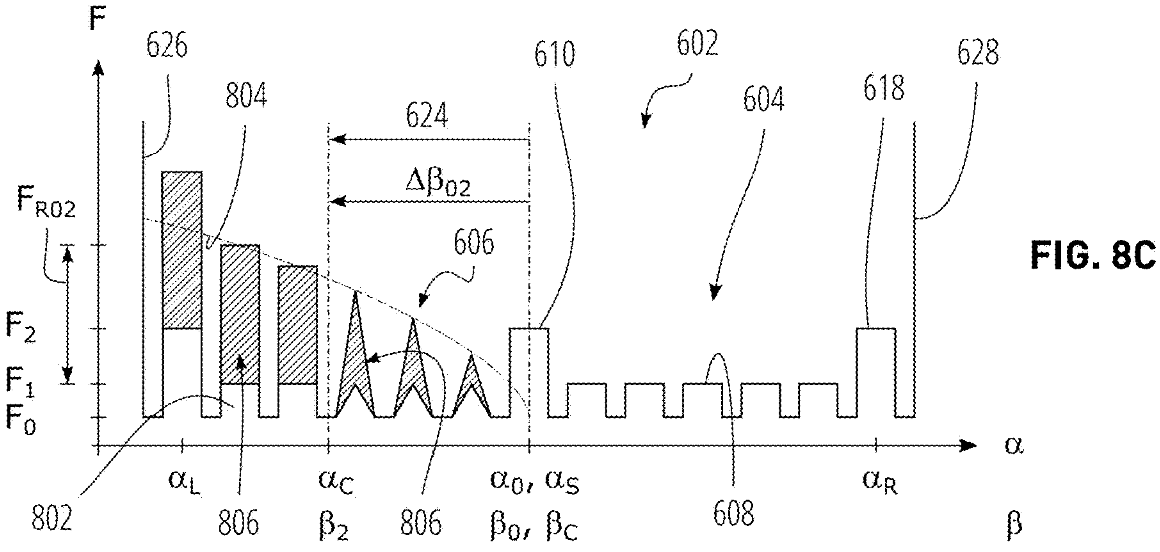
FIG. 8C illustrates a force feedback characteristic for the user interface.

Optionally, the control unit 40 may increase the ripple resistances of each ripple 608, 802 in alignment with a function 804. The function 804 may be a linear function as shown in FIG. 8A or FIG. 8B. Alternatively, the control unit 40 may adjust the ripple resistances in dependence of other types of functions, such as a degressive function 804 shown in FIG. 8C, a progressive function or a regressive function. The function 804 can be stored in the memory 8 of the control unit 40.

After increasing the ripple resistances in dependence of the position difference $\Delta\beta$, the method proceeds to act S214 and ends. The method M2 may be automatically restarted again by act S200, e. g. for executing method M2 in a loop.

In response to the deflection of the input element 9 to the current position $\alpha_C$, the control unit 40 controls the actuators 20A and 20B to move the current position $\beta_C$ of the actuators 20 towards the target position $\beta_T$ as demanded by the input element 9. The closer current position $\beta_C$ of the actuators 20 is moved towards the target position $\beta_T$, the more the position difference $\Delta\beta$ is reduced.

So, while the current position $\Delta_C$ of the actuators 20 moves towards the target position $\beta_T$ corresponding with $\beta_2$, the current position $\beta_C$ may reach position $\beta_1$ as shown in FIG. 3A and FIG. 3B. The method M2 is restarted again and consequently, the control unit 40 determines position $\beta_1$ as the current position $\beta_C$ of the actuators 20 at act S202.

It is assumed that the position of the input element 9 has not been changed so that the target position $\beta_T$ of the actuators 20 is still the same as described before. Hence, the control unit 40 determines position $\beta_2$ as target position $\beta_T$ at act S204.

Based on position $\beta_1$ as the current position $\beta_C$ and position $\beta_2$ as target position $\beta_T$, the control unit 40 determines, analogously as described above, a position difference $\Delta\beta_{12}$ between the current position $\beta_C$ and the target position $\beta_T$ as illustrated in FIG. 8B.

Then, the control unit 40 checks at act S208 that the position difference $\Delta\beta_{12}$ has been decreased in comparison to $\Delta\beta_{02}$ (see FIG. 3B) due to the convergence of the current position $\beta_C$ of the actuators 20 to the target position $\beta_T$ (compare also FIG. 8B with FIG. 8A). Consequently, the method proceeds to act S212.

At act S212, the control unit 40 decreases the resistance defined by the force feedback characteristic 602 as shown in FIG. 8A. I. e. the resistances $F_R$ of the ripple additions 806 are reduced for providing a force feedback characteristic 602 comprising ripples 608, 802 with lower ripple additions 806 for the smaller position difference $\Delta\beta_{12}$ as shown in FIG. 8B in contrast to the force feedback characteristic 602 comprising ripples 608, 802 with higher ripple additions 806 provided for the greater position difference $\Delta\beta_{02}$ as shown in FIG. 8A. Notwithstanding that the resistances $F_R$ of the ripple additions 806 are reduced, the control unit 40 will increase ripple resistances of ripples 608, 802 as long as the current position $\beta_C$ of the actuators 20 deviates from the target position $\beta_T$. Hence, the procedure for increasing the ripple resistance of ripples 608, 802 as described for act S210 above will apply here analogously, too.

After decreasing the ripple resistances in dependence of the position difference $\Delta\beta$, the method proceeds to act S214 and ends. The method M2 may be automatically restarted again by act S200, e. g. for executing method M2 in a loop. While the control unit 40 controls the current position $\beta_C$ of the actuators 20 to be moved to the target position $\beta_T$, method M2 may be repeated recurrently to adjust the force feedback characteristic 602 successively. When the current position $\beta_C$ of the actuators 20 has reached the target position $\beta_T$, the force feedback characteristic 602 will comprise a characteristic as shown in FIG. 6B provided that the current position $\alpha_C$ of the input element 9 and the set point position $\alpha_S$ (controllable by the setting dial 11) have not been adjusted in the meantime.

Figure 8D:
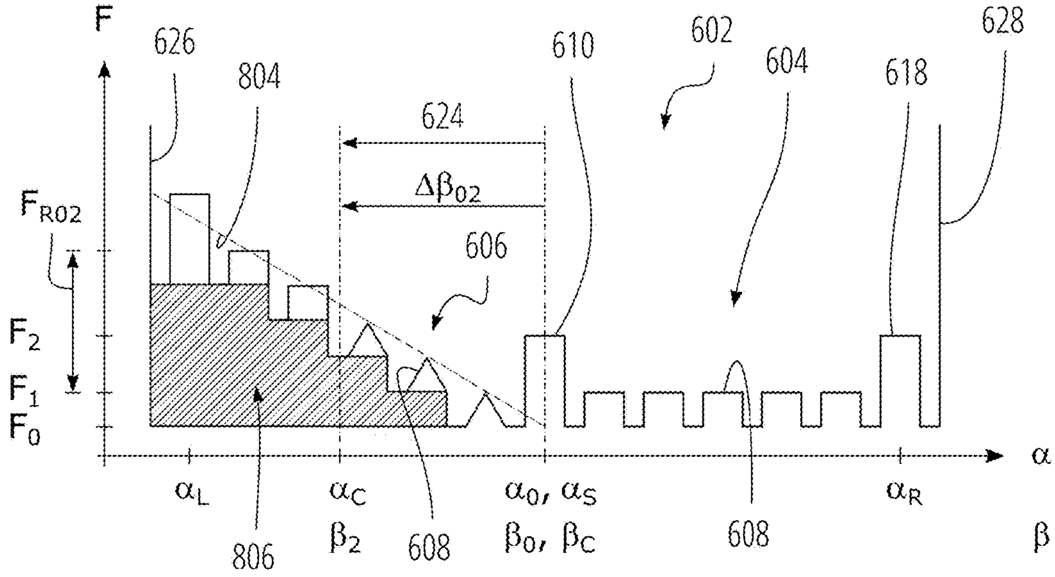
FIG. 8D illustrates a force feedback characteristic for the user interface.

As can been sin in FIG. 6A to FIG. 6D and FIG. 8A to FIG. 8C, the ripple resistance of each ripple 608, 612, 614, 620, 802 drops down to a base resistance corresponding to the minimum resistance $F_0$. But the base resistance of each ripple may optionally also be adjusted by executing the method acts S210 or S212 of method M2 as shown in FIG. 8D. As indicated by the ripple addition 806, the base resistance increases stepwise with increasing distance from the current position $\beta_C$ in the first direction indicated by the adjustment 624 from the minimum resistance $F_0$ up to a resistance value being greater than $F_2$. The base resistance may be increased when act S210 is executed and may be decreased when act S212 is executed. Analogously as described above, the control unit 40 may increase the ripple resistances of each ripple 608, 802 in alignment with a function 804.

All references cited herein are incorporated herein in their entireties. If there is a conflict between definitions herein and in an incorporated reference, the definition herein shall control.

What is claimed is:

1. A user interface for controlling an agricultural machine, comprising a moveable input element;

a feedback actuator for inducing a haptic feedback in the input element according to a force feedback characteristic, wherein the force feedback characteristic comprises at least one ripple having an adjustable ripple characteristic; and a control unit configured to adjust the ripple characteristic of the at least one ripple according to a first ripple characteristic or a second ripple characteristic being different to the first ripple characteristic.

2. The user interface of claim 1, wherein the control unit is configured to adjust the ripple characteristic in response to a movement of the input element.

3. The user interface of claim 1, wherein the control unit is configured to:

determine a set point position; and determine a current position of the input element.

4. The user interface of claim 3, wherein the control unit is configured to adjust the ripple characteristic according to the second ripple characteristic if the current position of the input element diverges from the set point position.

5. The user interface of claim 3, wherein the control unit is configured to adjust the ripple characteristic according to the first ripple characteristic if the current position of the input element converges to the set point position.

6. The user interface of claim 3, wherein the control unit is configured to adjust the ripple characteristic according to the second ripple characteristic if the at least one ripple is located within an adjustment range extending between the set point position and the current position of the input element.

7. The user interface of claim 6, wherein the control unit is configured to adjust the ripple characteristic according to the first ripple characteristic if the at least one ripple is located out of the adjustment range.

8. The user interface of claim 1, wherein the first or the second ripple characteristic is U-shaped, V-shaped or W-shaped.

9. The user interface of claim 3, wherein the control unit is configured to assign a set point ripple of the force feedback characteristic to the set point position; and adjust the position of the set point ripple according to the adjustment of the set point position, wherein the set point position is adjustable.

10. The user interface of claim 9, wherein the set point ripple has a ripple resistance being higher than a ripple resistance of a ripple adjacent to the set point ripple.

11. The user interface of claim 1, wherein the force feedback characteristic comprises at least one adjustable end position ripple having a ripple resistance being higher than a ripple resistance of a ripple adjacent to the end position ripple.

12. The user interface of claim 11, wherein the control unit is configured to adjust the ripple characteristic of the at least one ripple according to a third ripple characteristic or a fourth ripple characteristic being different to the third ripple characteristic.

13. An agricultural machine comprising a hitch system; and a user interface of claim 1, wherein the hitch system is moveable between an upper limit and a lower limit, wherein the control unit is configured to control a movement of the hitch system according to an operation of the user interface.

14. A method of adjusting a haptic feedback of a user interface, comprising:

determining a set point position;

determining a current position of the input element; and adjusting a ripple characteristic of at least one ripple according to a second ripple characteristic being different to a first ripple characteristic if the at least one ripple is located within an adjustment range extending between the set point position and the current position of the input element.

15. The method of claim 14, further comprising:

adjusting the ripple characteristic according to the first ripple characteristic if the at least one ripple is located out of the adjustment range.

16. The method of claim 14, further comprising:

adjusting the ripple characteristic according to the second ripple characteristic if the current position of the input element diverges from the set point position; and adjusting the ripple characteristic according to the first ripple characteristic if the current position of the input element converges to the set point position.

* * * * *